US012534502B2

(12) United States Patent
Tovey et al.

(10) Patent No.: US 12,534,502 B2
(45) Date of Patent: Jan. 27, 2026

(54) FGF21 RESPONSIVE REPORTER GENE CELL LINE

(71) Applicant: SVAR LIFE SCIENCE AB, Malmö (SE)

(72) Inventors: Michael Tovey, Paris (FR); Lue Huang, Paris (FR); Christophe Lallemand, Paris (FR)

(73) Assignee: SVAR LIFE SCIENCE AB, Malmö (SE)

( * ) Notice: Subject to any disclaimer, the term of this patent is extended or adjusted under 35 U.S.C. 154(b) by 396 days.

(21) Appl. No.: 16/339,059

(22) PCT Filed: Mar. 10, 2017

(86) PCT No.: PCT/EP2017/075055
§ 371 (c)(1),
(2) Date: Apr. 3, 2019

(87) PCT Pub. No.: WO2018/065403
PCT Pub. Date: Apr. 12, 2018

(65) Prior Publication Data
US 2024/0076332 A1 Mar. 7, 2024

(30) Foreign Application Priority Data
Oct. 4, 2016 (EP) .................................. 16192296

(51) Int. Cl.
C07K 14/50 (2006.01)
C12N 5/071 (2010.01)
C12N 15/85 (2006.01)
G01N 33/68 (2006.01)
G01N 33/74 (2006.01)

(52) U.S. Cl.
CPC ............ *C07K 14/50* (2013.01); *C12N 5/0686* (2013.01); *C12N 15/85* (2013.01); *G01N 33/6854* (2013.01); *G01N 33/74* (2013.01); C12N 2503/00 (2013.01); G01N 2333/50 (2013.01)

(58) Field of Classification Search
CPC .... C07K 14/50; C12N 15/85; C12N 2503/00; G01N 2333/50
See application file for complete search history.

(56) References Cited

U.S. PATENT DOCUMENTS

| 7,470,536 B2 * | 12/2008 | Tovey | ................ | G01N 33/5005 |
| | | | | 435/325 |
| 8,697,369 B2 * | 4/2014 | Suzuki | ................ | A61K 38/1825 |
| | | | | 514/9.1 |
| 8,759,091 B2 * | 6/2014 | Tovey | ................ | C07K 14/715 |
| | | | | 435/325 |
| 9,188,580 B2 * | 11/2015 | Tovey | ................ | G01N 33/5005 |
| 9,969,801 B2 * | 5/2018 | Tovey | ................ | G01N 33/5041 |
| 2009/0136947 A1 * | 5/2009 | Tovey | ................ | G01N 33/5041 |
| | | | | 435/6.16 |
| 2010/0184665 A1 | 7/2010 | Suzuki | | |
| 2014/0148388 A1 * | 5/2014 | Sonoda | ................ | A61P 21/02 |
| | | | | 530/387.3 |
| 2015/0210764 A1 * | 7/2015 | Mondal | ................ | A61P 3/08 |
| | | | | 424/139.1 |

FOREIGN PATENT DOCUMENTS

KR 10-1952453 A 8/2012

OTHER PUBLICATIONS

Hexdall L, Zheng CF. Stable luciferase reporter cell lines for signal transduction pathway readout using GAL4 fusion transactivators. Biotechniques. May 2001;30(5):1134-8, 1140. doi: 10.2144/01305dd06. PMID: 11355349. (Year: 2001).*
Mauro VP, Chappell SA. A critical analysis of codon optimization in human therapeutics. Trends Mol Med. Nov. 2014;20(11):604-13. doi: 10.1016/j.molmed.2014.09.003. Epub Sep. 25, 2014. PMID: 25263172; PMCID: PMC4253638. (Year: 2014).*
Hexdall et al. (Bio Techniques 30:1134-1140 (May 2001) (Year: 2001).*
Mauro et al. (Trends Mol Med. Nov. 2014; 20(11): 604--613.) (Year: 2014).*
Hexdall et al. (BioTechniques 30:1134-1140 (May 2001), Mauro et al. (Trends Mol Med. Nov. 2014; 20(11): 604--613.) (Year: 2014).*
Hexdall et al., Product Application Focus Stable Luciferase Reporter Cell Lines for Signal Transduction Pathway Readout Using GAL4 Fusion Transactivators, Drug Discovery and Genomictechnologies, BioTechniques 30(5):1134-1140 (May 2001).
Anonymous: "Application Note Quantification of FGF21 using iLite(TM) FGF21 Assay Ready Cells" Euro Diagnostica: Biomonitor, pp. 1-4 (Apr. 2016).
Anonymous: "Product Specification iLite(TM) FGF21 Assay Ready Cells", Euro Diagnostica: Biomonitor, pp. 1-2 (Mar. 2016).
J Yie et al,. Understanding the Physical Interactions in the FGF21/FGFR/[beta]-Klotho Complex: Structural Requirements and Implications in FGF21 Signaling, Chemical Biology & Drug Design, pp. 393-410, vol. 79, No. 4 (Apr. 2012).
Hexdall et al., Product Application Focus Stable Luciferase Reporter Cell Lines for Signal Transduction Pathway Readout Using GAL4 Fusion Transactivator, Biotechniques Rapid Dispatches, pp. 1134-1140, vol. 30, No. 5 (May 2001).

* cited by examiner

Primary Examiner — Fereydoun G Sajjadi
Assistant Examiner — Joel D Levin
(74) Attorney, Agent, or Firm — Lisa Mueller; Casimir Jones SC

(57) ABSTRACT

The present invention relates to a mammalian FGF21 responsive reporter cell line and method of using the same for detecting and optionally quantitating FGF21 activity in a test sample. The invention further relates to a method for detecting and optionally quantitating neutralizing antibodies against FGF21 present in a test sample using the reporter cell line of the present invention.

15 Claims, 14 Drawing Sheets
Specification includes a Sequence Listing.

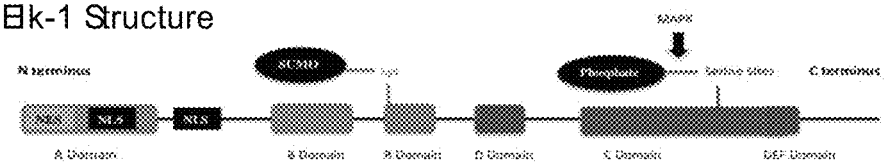
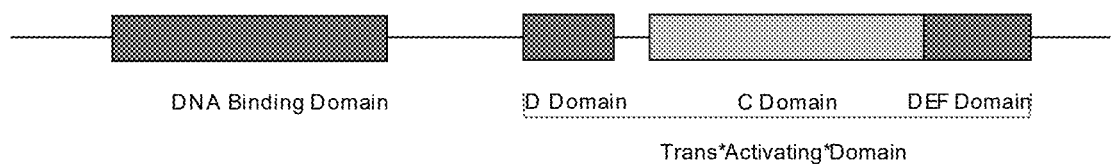
FIG. 1

FIG. 3A

Alignment of Sequence_1: [ORF beta-Klotho (NM_175737).xdna] with
Sequence_2: [KLB Opti no Kozak]
Score = 2628 bits (2914), Expect = 0.0
Identities = 2462/3129 (79%), Gaps = 2/3129 (0%)
Strand=Plus/Plus Seq_1 1
ATGAAGCCAGGCTGTGCGGCAGGATCTCCAGGGAATGAATGGATTTTCTTCAGCACTGAT 60
|||||||| || ||||| || ||| || || || || |||||
|||||||||| ||
Seq_2 1
ATGAAGCCTGGATGTGCCGCCGGAAGCCCCGGCAACGAGTGGATCTTCTTCAGCACCGAC 60

Seq_1 61
GAAATAACCACACGCTATAGGAATACAATGTCCAACGGGGGATTGCAAAGATCTGTCATC 120
|| || |||||| || || || || || || ||| |||||| || ||||| |
|| |||
Seq_2 61
GAGATCACCACCCGGTACAGAAACACCATGAGCAACGGCGGCCTGCAGCGGAGCGTGATC 120

Seq_1 121
CTGTCAGCACTTATTCTGCTACGAGCTGTTACTGGATTCTCTGGAGATGGAAGAGCTATA 180
||||| || || || ||||| |||| || || || || || || ||
|||||| ||
Seq_2 121
CTGTCTGCTCTGATCCTGCTGAGAGCCGTGACCGGCTTTAGCGGCGACGGCAGAGCCATC 180

Seq_1 181
TGGTCTAAAAATCCTAATTTTACTCCGGTAAATGAAAGTCAGCTGTTTCTCTATGACACT 240
||||| || || || || || || || || || |||||||||| ||||
|| ||
Seq_2 181
TGGTCCAAGAACCCCAACTTCACCCCCGTGAACGAGAGCCAGCTGTTCCTGTACGATACC 240

Seq_1 241
TTCCCTAAAAACTTTTTCTGGGGTATTGGGACTGGAGCATTGCAAGTGGAAGGGAGTTGG 300
|||||| || |||| |||||||| ||| || || || || || |||| ||||||||
|| |||
Seq_2 241
TTCCCCAAGAACTTCTTCTGGGGCATCGGCACAGGCGCCCTGCAGGTGGAAGGCAGCTGG 300

Seq_1 301
AAGAAGGATGGAAAAGGACCTTCTATATGGGATCATTTCATCCACACACACCTTAAAAAT 360
|||||||||| || || || |||||| || |||||||||||||| |||||
|| ||
Seq_2 301
AAGAAGGATGGCAAGGGCCCCAGCATCTGGGACCACTTCATCCACACCCACCTGAAGAAC 360

Seq_1 361
GTCAGCAGCACGAATGGTTCCAGTGACAGTTATATTTTTCTGGAAAAAGACTTATCAGCC 420
|| ||||| || || ||| ||||| || |||||| |||| |||||| ||||
|||
Seq_2 361
GTGTCCAGCACCAACGGCAGCAGCGACAGCTACATCTTCCTGGAAAAGGACCTGAGCGCC 420

Seq_1 421
CTGGATTTTATAGGAGTTTCTTTTTATCAATTTTCAATTTCCTGGCCAAGGCTTTTCCCC 480
||||| || || || ||||| || || || || |||||||| ||||
||||||
Seq_2 421
CTGGACTTCATCGGCGTGTCCTTCTACCAGTTCAGCATCAGCTGGCCCAGACTGTTCCCC 480

FIG. 3B

Seq_1 481
GATGGAATAGTAACAGTTGCCAACGCAAAAGGTCTGCAGTACTACAGTACTCTTCTGGAC 540
|| || || |||||| ||||| || || || |||||||||||||||||| || ||
||||||
Seq_2 481
GACGGCATCGTGACAGTGGCCAATGCCAAGGGCCTGCAGTACTACAGCACCCTGCTGGAC 540

Seq_1 541
GCTCTAGTGCTTAGAAACATTGAACCTATAGTTACTTTATACCACTGGGATTTGCCTTTG 600
|| || |||||| ||||||||| || || || || || | |||||||||||
|||| ||
Seq_2 541
GCCCTGGTGCTGAGAAACATCGAGCCCATCGTGACCCTGTACCACTGGGACCTGCCACTG 600

Seq_1 601
GCACTACAAGAAAAATATGGGGGGTGGAAAAATGATACCATAATAGATATCTTCAATGAC 660
|| || || |||| || |||||||| || |||||| || ||
|||||||| |||
Seq_2 601
GCTCTGCAGGAGAAATACGGCGGCTGGAAAAACGACACCATCATCGACATCTTCAACGAC 660

Seq_1 661
TATGCCACATACTGTTTCCAGATGTTTGGGGACCGTGTCAAATATTGGATTACAATTCAC 720
|| |||||| ||||| |||||||||||| || |||| || || || |||||| ||
|| |||
Seq_2 661
TACGCCACCTACTGCTTCCAGATGTTCGGCGACAGAGTGAAGTACTGGATCACCATCCAC 720

Seq_1 721
AACCCATATCTAGTGGCTTGGCATGGGTATGGGACAGGTATGCATGCCCCTGGAGAGAAG 780
|||||| || |||||| |||||| || ||||| || || ||||||||||||||
||||||
Seq_2 721
AACCCCTACCTGGTGGCCTGGCACGGCTATGGCACCGGAATGCATGCCCCTGGCGAGAAG 780

Seq_1 781
GGAAATTTAGCAGCTGTCTACACTGTGGGACACAACTTGATCAAGGCTCACTCGAAAGTT 840
|||||| | || || |||||| |||||| |||||| |||||||||| |||
|||||
Seq_2 781
GGAAATCTGGCCGCCGTGTACACCGTGGGCCACAACCTGATCAAGGCCCACAGCAAAGTG 840

Seq_1 841
TGGCATAACTACAACACACATTTCCGCCCACATCAGAAGGGTTGGTTATCGATCACGTTG 900
|||| ||||||||| | |||||| || || |||||||| ||| | |
|||||| ||
Seq_2 841
TGGCACAACTACAACACCCACTTCCGGCCCCACCAGAAGGGCTGGCTGTCTATCACACTG 900

Seq_1 901
GGATCTCATTGGATCGAGCCAAACCGGTCGGAAAACACGATGGATATATTCAAATGTCAA 960
|| || |||||||||| ||||| || ||||| |||||||| |||||
|| ||
Seq_2 901
GGCAGCCACTGGATCGAGCCTAACCGCAGCGAGAACACCATGGATATCTTCAAGTGCCAG 960

Seq_1 961
CAATCCATGGTTTCTGTGCTTGGATGGTTTGCCAACCCTATCCATGGGGATGGCGACTAT 1020
|||||||| || ||||| || ||||||||||| || |||||| ||||||||| ||
||||||||
Seq_2 961
CAGAGCATGGTGTCCGTGCTGGGATGGTTCGCCAACCCCATTCATGGCGACGGCGACTAC 1020

FIG. 3C

Seq_1 1021
CCAGAGGGGATGAGAAAGAAGTTGTTCTCCGTTCTACCCATTTTCTCTGAAGCAGAGAAG 1080
|| |||||| ||| | |||||| ||||| ||| || ||||| ||| |||| ||
||||||
Seq_2 1021
CCCGAGGGCATGCGGAAGAAACTGTTCAGCGTGCTGCCCATCTTCAGCGAGGCCGAGAAG 1080
Seq_1 1081
CATGAGATGAGAGGCACAGCTGATTTCTTTGCCTTTTCTTTTGGACCCAACAACTTCAAG 1140
|| ||||||| ||||| || ||||||||| |||||| || ||
|||||||||||||||
Seq_2 1081
CACGAGATGCGGGGCACCGCCGATTTCTTCGCCTTTAGCTTCGGCCCCAACAACTTCAAG 1140
Seq_1 1141
CCCCTAAACACCATGGCTAAAATGGGACAAAATGTTTCACTTAATTTAAGAGAAGCGCTG 1200
||||| || |||||||| || ||||| || ||||||| || || || | |||||
|| ||||
Seq_2 1141
CCCCTGAATACCATGGCCAAGATGGGCCAGAATGTGTCCCTGAACCTGAGAGAGGCCCTG 1200
Seq_1 1201
AACTGGATTAAACTGGAATACAACAACCCTCGAATCTTGATTGCTGAGAATGGCTGGTTC 1260
||||||| || ||||| ||||||||||||| || ||| |||| || |||||
||||||||
Seq_2 1201
AACTGGATCAAGCTGGAGTACAACAACCCCCGGATCCTGATCGCCGAGAACGGCTGGTTC 1260
Seq_1 1261
ACAGACAGTCGTGTGAAAACAGAAGACACCACGGCCATCTACATGATGAAGAATTTCCTC 1320
|| |||||| ||||||||| || ||||||||| |||||||||| ||||||||||
|||||
Seq_2 1261
ACCGACAGCAGAGTGAAAACCGAGGACACCACCGCCATCTATATGATGAAGAACTTCCTG 1320
Seq_1 1321
AGCCAGGTGCTTCAAGCAATAAGGTTAGATGAAATACGAGTGTTTGGTTATACTGCCTGG 1380
|||||||||| || || || || | |||||| || || ||||| ||| ||
||||||
Seq_2 1321
AGCCAGGTGCTGCAGGCTATCCGGCTGGATGAGATCCGGGTGTTCGGCTACACAGCCTGG 1380
Seq_1 1381
TCTCTCCTGGATGGCTTTGAATGGCAGGATGCTTACACCATCCGCCGAGGATTATTTTAT 1440
|| || |||||||||||| || ||||||||| || ||||||||||| | || || |
|| ||
Seq_2 1381
TCACTGCTGGATGGCTTCGAGTGGCAGGACGCCTACACCATCAGACGGGGCCTGTTCTAC 1440
Seq_1 1441
GTGGATTTTAACAGTAAACAGAAAGAGCGGAAACCTAAGTCTTCAGCACACTACTACAAA 1500
||||| || |||||| || |||||||||||||||| || ||| ||
|||||||||||
Seq_2 1441
GTGGACTTCAACAGCAAGCAGAAAGAGCGGAAGCCCAAGAGCAGCGCCCACTACTACAAG 1500
Seq_1 1501
CAGATCATACGAGAAAATGGTTTTTCTTTAAAAGAGTCCACGCCAGATGTGCAGGGCCAG 1560
|||||||| |||| ||||||| || |||||| ||| || ||
||||||||||
Seq_2 1501
CAGATCATCAGAGAGAATGGCTTCAGCCTGAAAGAAAGCACCCCCGACGTGCAGGGCCAG 1560

FIG. 3D

Seq_1 1561
TTTCCCTGTGACTTCTCCTGGGGTGTCACTGAATCTGTTCTTAAGCCCGAGTCTGTGGCT 1620
|| |||||||| || |||||||| || || || || || |||||
||||||||||
Seq_2 1561
TTCCCCTGTGATTTTTCCTGGGGCGTGACCGAGAGCGTGCTGAAGCCTGAGTCTGTGGCC 1620
Seq_1 1621
TCGTCCCCACAGTTCAGCGATCCTCATCTGTACGTGTGGAACGCCACTGGCAACAGACTG 1680
|| ||| ||||| ||||| || || |||||||||||||||||||| |||||||
| |||

Seq_2 1621
TCCAGCCCCCAGTTTAGCGACCCCCACCTGTACGTGTGGAACGCCACCGGCAACCGGCTG 1680
Seq_1 1681
TTGCACCGAGTGGAAGGGGTGAGGCTGAAAACACGACCCGCTCAATGCACAGATTTTGTA 1740
|||| |||||||||| ||| |||||||||| ||||||| || |||||| ||
|| ||
Seq_2 1681
CTGCATAGAGTGGAAGGCGTGCGGCTGAAAACCAGACCCGCCCAGTGCACCGACTTCGTG 1740
Seq_1 1741
AACATCAAAAAACAACTTGAGATGTTGGCAAGAATGAAAGTCACCCACTACCGGTTTGCT 1800
|||||||| ||||| || || ||| |||| | |||||||| |||||||| |
|| ||
Seq_2 1741
AACATCAAGAAACAGCTGGAAATGCTGGCCCGGATGAAAGTGACCCACTACAGATTCGCC 1800
Seq_1 1801
CTGGATTGGGCCTCGGTCCTTCCCACTGGCAACCTGTCCGCGGTGAACCGACAGGCCCTG 1860
|||||||||||| || || || || |||||||| || ||||||
||||||||||
Seq_2 1801
CTGGATTGGGCCTCCGTGCTGCCTACCGGAAACCTGTCTGCCGTGAACAGACAGGCCCTG 1860
Seq_1 1861
AGGTACTACAGGTGCGTGGTCAGTGAGGGGCTGAAGCTTGGCATCTCCGCGATGGTCACC 1920
|||||||| ||||||||||| |||||||| |||||| |||
|||||||
Seq_2 1861
AGGTACTACAGATGCGTGGTGTCCGAGGGCCTGAAGCTGGGCATCAGCGCCATGGTCACA 1920
Seq_1 1921
CTGTATTATCCGACCCACGCCCACCTAGGCCTCCCCGAGCCTCTGTTGCATGCCGACGGG 1980
||||| || || |||||||||||||||| || || || || ||||||
||||||||||
Seq_2 1921
CTGTACTACCCCACCCACGCCCACCTGGGACTGCCTGAACCTCTGCTGCATGCCGACGGC 1980
Seq_1 1981
TGGCTGAACCCATCGACGGCCGAGGCCTTCCAGGCCTACGCTGGGCTGTGCTTCCAGGAG 2040
|||||||| || || |||||||||||||||||||||| || |||||||
|||||
Seq_2 1981
TGGCTGAATCCTTCTACAGCCGAGGCCTTCCAGGCCTACGCCGGACTGTGCTTTCAGGAA 2040
Seq_1 2041
CTGGGGGACCTGGTGAAGCTCTGGATCACCATCAACGAGCCTAACCGGCTAAGTGACATC 2100
|||| |||| ||||||||| |||||||| ||||||||||| ||| || ||
||||||
Seq_2 2041
CTGGGCGACCTCGTGAAGCTGTGGATCACAATCAACGAGCCCAACAGACTGAGCGACATC 2100

FIG. 3E

```
Seq_1 2101
TACAACCGCTCTGGCAACGACACCTACGGGGCGGCGCACAACCTGCTGGTGGCCCACGCC 2160
|||||| | |||||||||||||||| || || |||||| ||||||||||||
|| |||
Seq_2 2101
TACAACAGAAGCGGCAACGACACCTACGGCGCTGCCCACAATCTGCTGGTGGCTCATGCC 2160
Seq_1 2161
CTGGCCTGGCGCCTCTACGACCGGCAGTTCAGGCCCTCACAGCGCGGGGCCGTGTCGCTG 2220
|||||||||| || ||||||| | |||||||| || |||||| ||
|||||||| |||
Seq_2 2161
CTGGCCTGGCGGCTGTACGACAGACAGTTCAGACCAAGCCAGCGGGGAGCCGTGTCTCTG 2220
Seq_1 2221
TCGCTGCACGCGGACTGGGCGGAACCCGCCAACCCCTATGCTGACTCGCACTGGAGGGCG 2280
|| |||| || |||| || |||||||| |||| || |||||| ||
|||||| ||
Seq_2 2221
TCTCTGCATGCTGATTGGGCCGAGCCCGCCAACCCTTACGCCGACTCTCATTGGAGAGCC 2280
Seq_1 2281
GCCGAGCGCTTCCTGCAGTTCGAGATCGCCTGGTTCGCCGAGCCGCTCTTCAAGACCGGG 2340
|||||||| |||||||||||||||||||| ||||| |||||||| ||
||||||||||
Seq_2 2281
GCCGAGCGGTTCCTGCAGTTCGAGATCGCTTGGTTTGCCGAGCCCCTGTTCAAGACCGGC 2340
Seq_1 2341
GACTACCCCGCGGCCATGAGGGAATACATTGCCTCCAAGCACCGACGGGGGCTTTCCAGC 2400
|| |||||| || |||||||| || || || ||| |||||| || || ||||
||||
Seq_2 2341
GATTACCCTGCCGCCATGAGAGAGTATATCGCCAGCAAGCACAGAAGAGGCCTGAGCAGC 2400
Seq_1 2401
TCGGCCCTGCCGCGCCTCACCGAGGCCGAAAGGAGGCTGCTCAAGGGCACGGTCGACTTC 2460
|| ||||||| || || |||||||||||||| |||||||| |||||||| ||
|| |||
Seq_2 2401
TCCGCCCTGCCTAGACTGACAGAGGCCGAAAGGCGGCTGCTGAAGGGCACCGTGGATTTC 2460
Seq_1 2461
TGCGCGCTCAACCACTTCACCACTAGGTTCGTGATGCACGAGCAGCTGGCCGGCAGCCGC 2520
|| || || |||||||||||| ||
||||||||||||||||||||||||||||||| |
Seq_2 2461
TGTGCCCTGAATCACTTCACCACCAGATTCGTGATGCACGAGCAGCTGGCCGGCAGCAGA 2520
Seq_1 2521
TACGACTCGGACAGGGACATCCAGTTTCTGCAGGACATCACCCGCCTGAGCTCCCCCACG 2580
|||||| ||| |||||||||||||||||||||||||||||| ||||||| ||||||
||| ||
Seq_2 2521
TACGACAGCGACCGGGACATCCAGTTTCTGCAGGACATCACCCGGCTGAGCAGCCCTACA 2580
Seq_1 2581
CGCCTGGCTGTGATTCCCTGGGGGGTGCGCAAGCTGCTGCGGTGGGTCCGGAGGAACTAC 2640
| |||||||| || |||||| |||||||| | ||||| || ||
||||||
Seq_2 2581
AGACTGGCCGTGATCCCTTGGGGCGTGCGGAAGCTGCTGAGATGGGTGCGCAGAAACTAC 2640
```

FIG. 3F

```
Seq_1 2641
GGCGACATGGACATTTACATCACCGCCAGTGGCATCGACGACCAGGCTCTGGAGGATGAC 2700
|||||||||||| || |||||||||||| |||||||||||||||||| |||||
||||||
Seq_2 2641
GGCGACATGGACATCTATATCACCGCCAGCGGCATCGACGACCAGGCCCTGGAAGATGAC 2700
Seq_1 2701
CGGCTCCGGAAGTACTACCTAGGGAAGTACCTTCAGGAGGTGCTGAAAGCATACCTGATT 2760
|||| |||||||||||||| || ||||||||| ||||| ||||||||| ||
||||||||
Seq_2 2701
CGGCTGCGGAAGTACTACCTGGGCAAGTACCTGCAGGAAGTGCTGAAGGCCTACCTGATC 2760
Seq_1 2761
GATAAAGTCAGAATCAAAGGCTATTATGCATTCAAACTGGCTGAAGAGAAATCTAAACCC 2820
|| |||||| ||||| ||||| || || |||||| |||||| || || ||
|| |||
Seq_2 2761
GACAAAGTGCGGATCAAGGGCTACTACGCCTTCAAGCTGGCCGAGGAAAAGAGCAAGCCC 2820
Seq_1 2821
AGATTTGGATTCTTCACATCTGATTTTAAAGCTAAATCCTCAATACAATTTTACAACAAA 2880
|||||| ||||||||| || || || || || ||| || || ||
||||||||
Seq_2 2821
AGATTCGGCTTCTTCACCAGCGACTTCAAGGCCAAGTCCAGCATCCAGTTCTACAACAAA 2880
Seq_1 2881
GTGATCAGCAGCAGGGGCTTCCCTTTTGAGAACAGTAGTTCTAGATGCAGTCAGACCCAA 2940
||||||||||||||||||||||| || ||||||||| || |||||||||
|||||| ||
Seq_2 2881
GTGATCAGCAGCAGGGGCTTCCCATTCGAGAACAGCAGCAGCAGATGCAGCCAGACACAG 2940
Seq_1 2941
GAAAATACAGAGTGCACTGTCTGCTTATTCCTTGTGCAGAAGAAACCACTGATATTCCTG 3000
|||||| |||||| || || ||| | ||||| |||||||||||| || |||||
|| |||
Seq_2 2941
GAAAACACCGAGTGTACCGTGTGCCTGTTCCTGGTGCAGAAGAAGCCTCTGATCTTTCTG 3000
Seq_1 3001 GGTTGTTGCTTCTTCTCCACCCTGGTTCTACTCTTATCAATTGCCATTTTTCAAAGGCA
3059
|| || |||||||| ||| ||||| || || || | ||||||||| |||||
||||
Seq_2 3001 GGCTGCTGCTTCTTTAGCACACTGGTGCTGCTGCTGAGCATTGCCATCTTTCAGCGGCA
3059
Seq_1 3060
GAAGAGAAGAAAGTTTTGGAAAGCAAAAAACTTACAACACATACCATTAAAGAAAGGCAA 3119
|||| ||||||||||||||||| || || || | ||| |||| || || ||
|||||
Seq_2 3060
GAAGCGGAGAAAGTTTTGGAAGGCCAAGAATCTGCAGCACATCCCCCTGAAAAAGGGCAA 3119
Seq_1 3120 GAGAGTTGT 3128
|||||| ||
Seq_2 3120 GCGGGTGGT 3128
```

|  | HEK2 Optimized β-Klotho | HEK1 Native β-Klotho | Jurkat Native β-Klotho |
|---|---|---|---|
| Sigmoidal, 4PL, X is log(concentration) |  |  |  |
| Best-fit values |  |  |  |
| Top | 142702 | 130408 | 40903 |
| Bottom | 13685 | 1737 | 1530 |
| LogIC50 | 0,8485 | 1,38 | 2,234 |
| HillSlope | 1,216 | 1,142 | 1,002 |
| IC50 | 7,055 | 23,97 | 171,6 |
| Span | 129017 | 128670 | 39373 |

Table 1

FIG. 6B cAACCGGAAGTGgaacAACCGGAAGTGgaacAACCGGAAGTGgaac
AACCGGAAGTGgaacAACCGGAAGTGgaacAACCGGAAGTGc

FIG. 8

FGF21 RESPONSIVE REPORTER GENE CELL LINE

CROSS-REFERENCE TO RELATED APPLICATIONS

This application is a national phase application under 35 U.S.C. § 371 of PCT International Application No. PCT/EP2017/075055, filed Mar. 10, 2017, which claims priority to European Application No. 16192296.8, filed Oct. 4, 2016, which are hereby incorporated by reference in its entirety.

INCORPORATION-BY-REFERENCE OF MATERIAL SUBMITTED ELECTRONICALLY

Incorporated by reference in its entirety herein is a computer-readable nucleotide/amino acid sequence listing submitted concurrently herewith and identified as follows: One 65,678 Byte ASCII (Text) file named "38524-251_ST25," created on Apr. 29, 2021.

FIELD OF THE INVENTION

The present invention relates to a mammalian FGF21 responsive reporter cell line and method of using the same for detecting and optionally quantitating FGF21 activity in a test sample. The invention further relates to a method for detecting and optionally quantitating neutralizing antibodies against FGF21 present in a test sample using the reporter cell line of the present invention.

BACKGROUND OF THE INVENTION

Human fibroblast growth factor 21 (FGF21) is a member of the family of the atypical fibroblast growth factors that include FGF19 and FGF23 in man. FGF21 stimulates glucose uptake in adipocytes and FGF21 is specifically induced by HMGCS2 (3-hydroxy-3-methylglutaryl-CoA synthase) to provide lipid-derived energy during carbohydrate deprivation during fasting. FGF21 has the potential to improve glycemic control in patients with type 2 diabetes, as well as the control of weight gain (W Y and Leung, 2016; Kliewer and Mangelsdorf, 2010; Fisher et al.).

Analogues of FGF21 are currently being tested in clinical trials in patients with type 2 diabetes and there is a need for a sensitive and specific assay both for the quantification of the potency and neutralizing antibody response to FGF21 and related analogues. FGF21 signals through a heterodimeric cell surface receptor composed of the tyrosine kinase FGFR1c receptor and beta-Klotho, single-pass membrane spanning protein with two glycosidase domains that is essential for optimal binding and activation of the FGF21 signal transduction pathway (Wang and Sun, 2009). Binding of FGF21 to the FGFR1c receptor in the presence of the beta-Klotho co-receptor leads to activation of the ras/raf MAP kinase signaling cascade, activation of ERK1/2 and phosphorylation and activation of the Elk-1 and SRF (Wang et al, 1997). Numerous other growth factors and cytokines present in human serum also employ the same signal transduction pathway rendering the development of a sensitive and specific assay for FGF21 difficult.

It follows that there is a need for a FGF21 responsive reporter gene cell line with for the detection of FGF21 activity while exhibiting minimal interference from normal human serum.

SUMMARY OF THE INVENTION

The present invention was made in view of the prior art described above, and the object of the present invention is to provide a mammalian FGF21 responsive reporter cell line. In particular the object is to provide a mammalian FGF21 responsive reporter cell line, which is sensitive to presence of FGF21 activity and uses the same signal transduction pathway as FGF21 and without interference from other growth factors present in human serum that use the same signal transduction pathway as FGF21.

To solve the problem, the present invention provides a mammalian cell line comprising
  (i) a first heterologous polynucleotide comprising a heterologous cis-acting regulatory sequence operably linked to a downstream promoter sequence, wherein said promoter is operably linked to an open reading frame encoding a first reporter protein,
  (ii) a second heterologous polynucleotide encoding a chimeric transcription factor, wherein said chimeric transcription factor comprises the trans-activation domain of Elk-1 fused to a heterologous DNA binding domain capable of binding to said cis-acting regulatory sequence, and
  (iii) a cell surface bound heterodimeric receptor protein comprising a tyrosine kinase FGFR1c and a beta-Klotho protein.

Another aspect of the present invention provides a method for detecting and optionally quantitating FGF21 activity in a test sample, said method comprising the steps of
  (i) providing a test sample,
  (ii) contacting said test sample with the cell line according to the present invention,
  (iii) determining the activity of the first reporter protein in said cell line.

A further aspect of the present invention concerns a method for detecting and optionally quantitating neutralizing antibodies against FGF21 present in a test sample, said method comprising the steps of
  (i) providing a test sample comprising,
  (ii) providing a first and a second cell sample, wherein said cells samples comprises the cell line according to the present invention,
  (iii) contacting the first cell sample with the test sample and subsequently with FGF21,
  (iv) contacting the second cell sample with FGF21,
  (iv) determining the activity of the first reporter protein in the cells of the first cell sample and determining the activity of the first reporter protein in the cells of the second cell sample,
  (v) provide the ratio between the reporter activity in first and a second cell sample, where a ratio (first/second) lower than one is indicative for the presence of antibodies against FGF21 in said sample.

Consequently, present invention provides a cell line, the use thereof in various contexts allowing for the detection of FGF21 activity while exhibiting minimal interference from normal human serum or other growth factor present in human serum that use the same signal transduction pathway as FGF21. As a further consequence thereof, present invention in all its aspects does not require any sample manipulation in order to minimise or remove other growth factors (other than FGF21) using the same signal transduction pathway as FGF21 in order to provide a reliable result.

Moreover, in addition to providing a means of reducing the non-specific increase in the firefly-luciferase reportergene activity caused by the presence of growth factors such as native Elk-1 present in normal serum as discussed above, the invention also increases the sensitivity of detection of human FGF-21 as illustrated in Table 1. Thus, cells transfected according to the invention provides for increased sensitivity of detection of human FGF-21.

Thus, in one embodiment the invention provides a cell allowing for detection of FGF21 activity while exhibiting minimal interference from normal human serum or other growth factor present in human serum that use the same signal transduction pathway as FGF21.

In another embodiment, the invention provides a cell line with increased sensitivity of detection of human FGF-21 in comparison with other cell lines used in the art.

In yet a further embodiment, the invention provides a cell line which allows for detection of FGF21 activity while exhibiting minimal interference from normal human serum or other growth factor present in human serum that use the same signal transduction pathway as FGF21 and at the same time offers increased sensitivity of detection of human FGF-21 in comparison with other cell lines used in the art.

For example, HEK293 cells transfected with the native β-klotho gene exhibited an EC50 of approximately 24 ng/ml for FGF-21 whereas HEK293 cells transfected with the codon optimized β-klotho gene exhibited an EC50 of approximately 7.0 ng/ml for FGF-21 reflecting the increased sensitivity of the cell containing the codon optimized β-klotho gene. Furthermore, Jurkat cells transfected with the native β-klotho gene exhibited an EC50 of 172 ng/ml for FGF-21 (Table 1).

Consequently, in one aspect, the invention relates to a cell enabling detection of FGF-21 with a higher sensitivity, such that the EC50 of cells transfected according to the invention is at least decreased in comparison with cells transfected with the corresponding native gene or genes. The gene may be e.g. the β-klotho gene but may otherwise comprise other or further genes. The decrease may be about 2-fold, such as e.g. about 3-fold, such as e.g. about 4-fold, such as e.g. about 5-fold, such as e.g. 6-fold, such as e.g. 7-fold, such as e.g. about 8-fold, such as e.g. 9-fold, such as e.g. 10-fold, such as e.g. 50-fold, such as about 100-fold, or such as about 1000-fold.

BRIEF DESCRIPTION OF THE DRAWINGS

FIG. 1 illustrates the structure of the Chimeric Elk-1-Gal4 Transcription Factor (i.e., labeled the BK-1 Structure).

FIGS. 3A-F illustrates the alignment of optimized synthetic (SEQ ID NO:1) and native beta-Klotho genes.

FIGS. 6A-B illustrates the effect of normal human serum on the response of HEK293 cells transfected with the optimized synthetic native beta-Klotho gene. Table 1 (FIG. 6B) shows the comparison of the response of cells transfected with the optimized synthetic and native beta-Klotho genes in the freeze, thaw and use format.

As shown in FIG. 7 treatment of HEK293 cells with DMEM culture medium containing 10% normal serum increased the activity of firefly luciferase reporter-gene under the control of 6-fold tandem repeat of the canonical Elk-1 recognition sequence by approximately 32% relative to cells in DMEM culture medium alone. In contrast, HEK293 cells transfected with the firefly luciferase reporter-gene under the control of the chimeric gal4-Elk-exhibited only a 9.5% increase in the activity of firefly luciferase in the presence of DMEM containing 10% normal serum relative to cells in DMEM culture medium alone.

FIG. 8 illustrates a 6-fold tandem repeat of the canonical native Elk-1 recognition sequence.

DETAILED DESCRIPTION OF THE INVENTION

Figure 2:
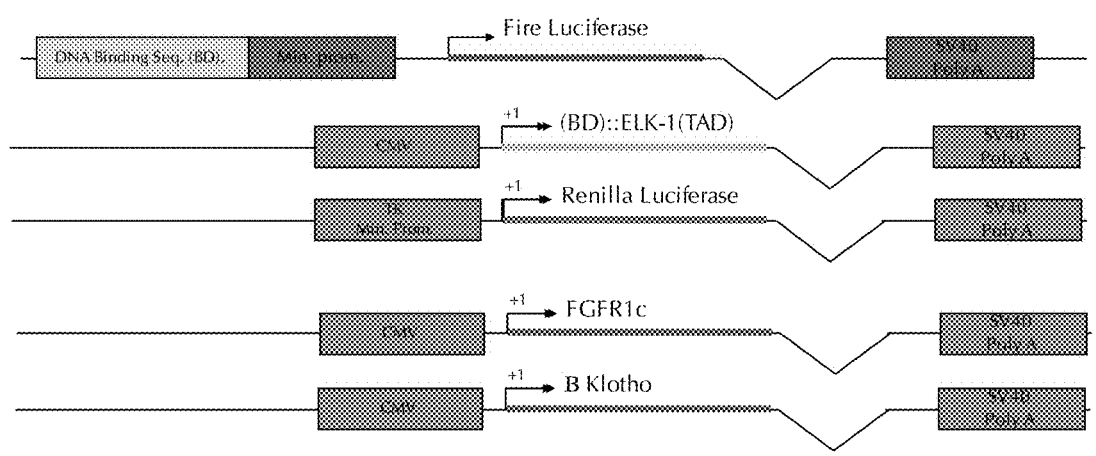
FIG. 2 illustrates FGF21 Responsive Reporter-Gene Cell Line: Molecular Constructs

In describing the embodiments of the invention specific terminology will be resorted to for the sake of clarity. However, the invention is not intended to be limited to the specific terms so selected, and it is understood that each specific term includes all technical equivalents which operate in a similar manner to accomplish a similar purpose.

The present inventors provide a reporter cell line and methods of using the same for detecting/quantitating FGF21 activity in a test sample. The inventors further provide a method for detecting/quantitating antibodies against FGF21. One method includes testing the capacity of an antibody to neutralize the FGF21 activity.

In order to develop a reporter-gene assay specific for FGF21 and without interference from other growth factors present in human serum that use the same signal transduction pathway as FGF21, the inventors have co-transfected human cells including the T-cell line Jurkat cells (ATCC® TIB-152) and the embryonic kidney cell line HEK293 cells (ATCC® CRL-1573) with a firefly luciferase (FL) reporter-gene construct regulated by a chimeric transcription factor consisting of the trans-activation domain of Elk-1 fused to a DNA binding domain that does not exist in mammalian cells, such as that of Gal4. The cells are co-transfected with an expression factor encoding the chimeric transcription factor such that only the chimeric transcription factor will bind to the sequence regulating the reporter gene, such as the up-stream activation sequence (UAS) of gal4. Native endogenous Elk-1 is produced and acts in an identical manner as in wild type cells but will not bind to or activate the chimeric promoter regulating the FL reporter-gene that is regulated exclusively by the chimeric transcription factor. The cells were also co-transfected with expression vectors encoding the FGFR1c receptor chain, and the beta-Klotho co-receptor and the gene encoding Renilla luciferase under the control of a constitutive promoter. The resultant reporter gene cell lines were used as the basis for the establishment of sensitive and specific assays for FGF21 with an EC50 of 170 and 24 ng/ml for Jurkat cells and HEK293 cells respectively with minimal interference from normal human serum. The FGF21 responsive cells are produced in the freeze, thaw and use format described in U.S. Pat. No. 9,188,580.

The inventors further investigated how to further improve the reporter cell. In particular, the inventors investigated how to increase the sensitivity for the detection of FGF21 activity while exhibiting minimal interference from normal human serum.

Definitions

Vector

The term "vector" or vector construct" refers to a DNA molecule used as a vehicle to transfer recombinant genetic material into a host cell. The four major types of vectors are plasmids, bacteriophages and other viruses, cosmids, and artificial chromosomes. The vector itself is generally a DNA sequence that consists of an insert (a heterologous nucleic acid sequence, transgene) and a larger sequence that serves as the "backbone" of the vector. The purpose of a vector which transfers genetic information to the host is typically to isolate, multiply, or express the insert in the target cell. Vectors called expression vectors (expression constructs) are specifically adapted for the expression of the heterologous sequences in the target cell, and generally have a promoter sequence that drives expression of the heterologous sequences. The choice of vector employed in embodiments of the present invention depends on the specific application of the vector encoding the polypeptides or polynucleotide.

Operatively Linked

The term "operatively linked" refers to the connection of elements being a part of a functional unit such as a gene or an open reading frame. Accordingly, by operatively linking a promoter to a nucleic acid sequence encoding a polypeptide (an open reading frame, ORF) the two elements becomes part of the functional unit—a gene. The linking of the expression control sequence (promoter) to the nucleic acid sequence enables the transcription of the nucleic acid sequence directed by the promoter. By operatively linking two heterologous nucleic acid sequences encoding a polypeptide the sequences becomes part of the functional unit—an open reading frame encoding a fusion protein comprising the amino acid sequences encoding by the heterologous nucleic acid sequences. By operatively linking two amino acids sequences, the sequences become part of the same functional unit—a polypeptide. Operatively linking two heterologous amino acid sequences generates a hybrid (fusion) polypeptide.

A first aspect of the present invention concerns a mammalian cell line comprising (i) a first heterologous polynucleotide comprising a heterologous cis-acting regulatory sequence operably linked to a downstream promoter sequence, wherein said promoter is operably linked to an open reading frame encoding a first reporter protein, (ii) a second heterologous polynucleotide encoding a chimeric transcription factor, wherein said chimeric transcription factor comprises the trans-activation domain of Elk-1 fused to a heterologous DNA binding domain capable of binding to said cis-acting regulatory sequence, and (iii) a cell surface bound heterodimeric receptor protein comprising a tyrosine kinase FGFR1c and a beta-Klotho protein.

The mammalian cell line of the present invention (also referred to as the reporter cell line) is useful for assaying for the presence of FGF21 activity in a test sample. The reporter cell line may also be used for testing (such as screening or validating) the activity and potency of analogues of FGF21. Likewise, the mammalian cell line of the present invention may be used for testing (such as screening or validating) antibodies for the capacity (and potency) to neutralize the activity of FGF21.

In order to minimize the background activity of the reporter gene in the mammalian cell, the inventors preferably use a DNA binding domain and a cognate cis-acting regulatory sequence, which is not present in the genetic background of the mammalian cell to be used as host for the reporter system. Useful DNA binding domain/cis-acting regulatory sequence is typically found in organism remotely related to mammal, such as yeast or bacteria. Thus, in one embodiment of the present invention, the heterologous DNA binding domain and its cognate cis-acting regulatory sequence is yeast or bacterial of origin.

The recruitment of the chimeric transcription factor comprising trans-activation domain of Elk-1 fused to a heterologous DNA binding domain and binding to a cognate cis-acting regulatory sequence upstream of the promoter directing the reporter gene encoding the first report protein will stimulate the formation of the transcription complex om the promoter and thus the expression of the first reporter protein. The stimulated expression of the reporter is mediated by the FGF21 signal transduction pathway.

In a preferred embodiment, the cis-acting regulatory sequence is an upstream activation sequence (UAS) and said heterologous DNA binding domain is a DNA binding domain capable of bind to said upstream activation sequence.

In an even more preferred embodiment, the cis-acting regulatory sequence is a galactose-responsive upstream activation sequence ($UAS_G$) and said heterologous DNA binding domain is the DNA binding domain galactose-responsive transcription factor GAL4 (GAL4DB).

In another embodiment, the cis-acting regulatory sequence is the DNA binding site of LexA and said heterologous DNA binding domain is a DNA binding domain of repressor LexA protein.

Other useful systems include the TetR/TetO system and the Cumate/CuO system.

The cell used as host for establishing the reporter cell line of the invention may endogenously express a beta-Klotho protein, the protein that forms part of the cell surface bound heterodimeric receptor protein comprising a tyrosine kinase FGFR1c and a beta-Klotho protein.

However, in a preferred embodiment, an expression vector encoding a beta-Klotho protein and adapted to expressing the same is introduced into the mammalian cell. Thus in one embodiment, the cell comprises a heterologous polynucleotide comprising promoter operably linked to a down-stream open reading frame encoding a beta-Klotho protein and from which said beta-Klotho protein is expressed. The heterologous polynucleotide is typically an expression vector. The promoter operably linked to a down-stream open reading frame encoding a beta-Klotho protein is typically a promoter providing constitutive expression of beta-Klotho protein in the cell line. Examples of promoters useful for directing the expression of beta-Klotho protein in the cell line includes but are not limited to constitutively active promoters selected from the list consisting of cytomegalovirus (CMV) early enhancer/promoter, SV40 promoter, UBC promoter, PGK promoter, human β-actin (hACTB), human elongation factor-1α (hEF-1α), Thymidine Kinase (TK) promoter and cytomegalovirus early enhancer/chicken β-actin (CAG) promoters.

The inventors have found that the EC50 of the reporter system was significantly improved by the introduction of an expression construct encoding a beta-Klotho protein, where coding sequences (the ORF) has been optimized for expression in the mammalian host cell as compared to an expression construct comprising a native beta-Klotho protein.

Accordingly, in one embodiment of the present invention, the open reading frame encoding a beta-Klotho protein has been codon-optimized for expression in said cell. In a particular embodiment, the open reading frame comprises or consist of the sequence set forth in SEQ ID NO: 1 or a sequence having at least 75% sequence identity to SEQ ID NO: 1, such as 79% sequence identity to SEQ ID NO: 1, for example 85% sequence identity to SEQ ID NO: 1, such as 90% sequence identity to SEQ ID NO: 1, such as 95% sequence identity to SEQ ID NO: 1, for example 97% sequence identity to SEQ ID NO: 1, such as 98% sequence identity to SEQ ID NO: 1, for example 99% sequence identity to SEQ ID NO: 1.

In a preferred embodiment, the mammalian cell comprises a heterologous polynucleotide comprising promoter operably linked to a down-stream open reading frame encoding a beta-Klotho protein and from which said beta-Klotho protein is expressed, where the sequence of said open reading frame comprises or consist of the sequence set forth in SEQ ID NO: 1.

The reporter system may use any reporter gene suitable for the application. Typically, the system will use a reporter that is easy to establish in the test lab and which provides great sensitivity. Typically, the reporter gene encodes a reporter protein, which is an enzyme or a fluorescent protein.

In one embodiment, the reporter gene (the first reporter gene) encodes an enzyme. In a preferred embodiment, the reporter (the first reporter) is a luciferase, such as firefly luciferase or Renilla luciferase.

In another embodiment, the reporter gene (the first reporter gene) encodes a fluorescent protein and the first reporter protein is a fluorescent protein. Useful fluorescent protein includes green fluorescent protein (GFP) and related fluorescent protein, e.g. enhanced green fluorescent protein (EGFP), yellow fluorescent protein (YFP), blue fluorescent protein (BFP) and variant there of displaying a different excitation/emission spectra.

The inventors have found that it is useful to introduce a second reporter gene in the reporter cell line of the present invention (the mammalian cell). The second reporter gene is typically introduced in the form of a polynucleotide comprising promoter operably linked an open reading frame encoding the second reporter protein. The promoter directing the expression of the second reporter is typically constitutively active in the mammalian host cell used to establish the reporter cell line of the present invention. Useful constitutively active promoters include but at not limited to cytomegalovirus (CMV) early enhancer/promoter, SV40 promoter, UBC promoter, PGK promoter, human β-actin (hACTB), human elongation factor-1α (hEF-1α), Thymidine Kinase (TK) promoter and cytomegalovirus early enhancer/chicken β-actin (CAG) promoters.

The introduction of the second reporter protein in the mammalian cell reduces the inter-sample variation. The application of the second reporter protein provides means for compensating for inter-sample variation in cell densities due to loss of cells or variation in number of cells seeded.

The advantage of using the constitutive expression of any luciferase is that the results are not influenced by loss of the reporter gene cells, nor are the results influenced by serum matrix effects and provides a constant readily detectable level of luciferase activity. All of these can be compensated for by the normalization obtained through the use of the measurement of the constitutive expression of the other (second) luciferase. None of these advantages can be obtained with the use of a single reporter gene procedure which does not use such normalization.

Where a first and a second reporter protein is present, the reporters a typically selected such that same means for detection is used. For example, if the first reporter is a fluorescent protein such as a enhanced green fluorescent protein (EGFP), the second reporter protein is typically another species of this class of fluorescent protein, displays a different excitation/emission spectra.

In a preferred embodiment, the first reporter protein is a luciferase and the second reporter (constitutively expressed) is also a luciferase with the proviso that the luciferases are not the same. In this way, the activity of both luciferases is readily detectable and can be read sequentially in the same well of an assay plate. For example, when the reporter gene construct produces firefly luciferase (first reporter protein), the constitutive production may be of a second luciferase (second reporter protein), e.g., Renilla luciferase. The activity of the first luciferase normalized relative to the activity of the second luciferase is described in US 2011/0189658. When conducting the assay, after the first reporter gene luciferase is measured, then a reagent is added to quench that specific luciferase so that any following reading will just read the luciferase from the constitutive construct, which then may be used for the purpose of normalization, as will be described in more detail in Example 1.

The advantage of using the constitutive expression of any luciferase is that the results are not influenced by loss of the reporter gene cells, nor are the results influenced by serum matrix effects and provides a constant readily detectable level of luciferase activity. All of these can be compensated for by the normalization obtained through the use of the measurement of the constitutive expression of the other (second) luciferase. None of these advantages can be obtained with the use of a single reporter gene procedure which does not use such normalization.

The cell line used as host for establishing a may be any mammalian cell line comprising an intact FGF21 signal transduction pathway, thus where binding of FGF21 to the FGFR1c receptor in the presence of the beta-Klotho co-receptor leads to activation of the ras/raf MAP kinase signaling cascade, activation of ERK1/2 and phosphorylation and activation of the Elk-1 and SRF. Alternatively, it should be possible to restore the signalling pathway, e.g. by heterologous expression of the beta-Klotho co-receptor, where the receptor is absent and the underlying deficiency in the signalling pathway. Preferably the mammalian cell of the present invention is based on a mammalian host cell, where the FGF21 signal transduction pathway is intact.

In one embodiment, of the present invention, the cell line is selected from the group consisting of HEK293, Jurkat, K652 and U937. In a preferred embodiment, the cell line is HEK293.

The present invention provides a substantial improvement in the freeze, thaw and use format as described in U.S. Pat. No. 9,188,580 applied previously to FGF21 responsive cells in order to provide an improved sensitivity, while retaining minimal interference from normal human serum. As disclosed herein with Example 1, the improved sensitivity manifests itself in a substantially improved EC50 and a substantially improved EC50 and LLOQ (Lower Limit of Quantification).

These features are obtained by means of the present invention in which HEK293 cells were co transfected with the same reporter-gene construct, chimeric Elk-1 transcription factor, and FGFR1c receptor chain as used previously but with an optimized synthetic beta-Klotho gene with 79% homology to the native gene, and the gene encoding Renilla luciferase under the control of a constitutive promoter. The synthetic beta-Klotho gene has been designed to use the codons most frequently employed statistically in order to optimize translation and hence increase the efficiency with which the beta-Klotho co-receptor facilitates the binding of FGF21 to its receptor and activation of the signal transduction pathway. The resultant cell line is markedly more sensitive than the FGF21 responsive Jurkat or HEK293 cell lines previously established using the same cloning strategy but employing the native beta-Klotho gene.

As discussed herein, the mammalian cell line of the present invention is useful for assaying for the presence of FGF21 activity in a test sample. In another aspect, the reporter cell line of the present invention is used for testing (such as screening or validating) the activity and potency of analogues of FGF21. Likewise, the reporter cell line of the present invention may be used for testing (such as screening or validating) antibodies for the capacity (and potency) to neutralize the activity of FGF21.

Accordingly, one aspect of the present invention provides a method for detecting and optionally quantitating FGF21 activity in a test sample, said method comprising the steps of
- (i) providing a test sample,
- (ii) contacting said test sample with the cell line according to any one of the preceding claims,
- (iii) determining the activity of the first reporter protein in said cell line.

The method may be used to detect/quantitate FGF21 activity or the activity/potency of analogous of FGF21.

In a preferred embodiment, the method uses a second reporter protein as means for compensating for e.g. inter-sample variation.

Thus, in one embodiment, the cell line expresses a second reporter protein, said method further comprising
- (iv) determining the activity of the first reporter protein in said cell line,
- (v) providing the ratio between the activity of the first reporter protein and the second reporter protein.

A further aspect concerns, a method for detecting and optionally quantitating neutralizing antibodies against FGF21 present in a test sample, said method comprising the steps of
- (i) providing a test sample comprising,
- (ii) providing a first and a second cell sample, wherein said cells samples comprises the cell line according to any one of the preceding claims
- (iii) contacting the first cell sample with the test sample and subsequently with FGF21,
- (iv) contacting the second cell sample with FGF21,
- (iv) determining the activity of the first reporter protein in the cells of the first cell sample and determining the activity of the first reporter protein in the cells of the second cell sample,
- (v) provide the ratio between the reporter activity in first and a second cell sample, where a ratio (first/second) lower than one is indicative for the presence of antibodies against FGF21 in said sample.

In a preferred embodiment, the method uses a second reporter protein as means for compensating for e.g. inter-sample variation.

Thus, in one embodiment, the method for detecting and optionally quantitating antibodies against FGF21 present in a test sample comprises the steps of
- (i) providing a test sample comprising,
- (ii) providing a first and a second cell sample, wherein said cells samples comprises the cell line according to any one of the preceding claims, wherein said cell line expresses a second reporter protein
- (iii) contacting the first cell sample with the test sample and subsequently with FGF21,
- (iv) contacting the second cell sample with FGF21,
- (iv) determining the activity of the first and second reporter protein in the cells of the first cell sample and determining the activity of the first and second reporter protein in the cells of the second cell sample,
- (v) provide a first ratio between the reporter activity of the first and second reporter protein in the first cell sample, provide a second ratio between the reporter activity of the first and second reporter protein in the second cell sample
- (vi) provide a third ratio between first and second ratio of step (v), where a ratio (first/second) lower than one is indicative for the presence of antibodies against FGF21 in said sample.

When describing the embodiments of the present invention, the combinations and permutations of all possible embodiments have not been explicitly described. Nevertheless, the mere fact that certain measures are recited in mutually different dependent claims or described in different embodiments does not indicate that a combination of these measures cannot be used to advantage. The present invention envisages all possible combinations and permutations of the described embodiments.

The terms "comprising", "comprise" and "comprises" herein are intended to be optionally substitutable with the terms "consisting of", "consist of" and "consist of", respectively, in every instance. The invention will be more fully understood by reference to the following examples. They should not, however, be construed as limiting the scope of the invention. All literature citations are incorporated by reference.

The invention will hereafter be described by way of the following non-limiting items.

Item 1. A mammalian cell line comprising
- (i) a first heterologous polynucleotide comprising a heterologous cis-acting regulatory sequence operably linked to a downstream promoter sequence, wherein said promoter is operably linked to an open reading frame encoding a first reporter protein,
- (ii) a second heterologous polynucleotide encoding a chimeric transcription factor, wherein said chimeric transcription factor comprises the trans-activation domain of Elk-1 fused to a heterologous DNA binding domain capable of binding to said cis-acting regulatory sequence, and
- (iii) a cell surface bound heterodimeric receptor protein comprising a tyrosine kinase FGFR1c and a beta-Klotho protein.

Item 2. The mammalian cell according to claim 1, wherein said heterologous DNA binding domain and its cognate cis-acting regulatory sequence is yeast or bacterial of origin.

Item 3. The mammalian cell according to items 1 or 2, wherein said cis-acting regulatory sequence is an upstream activation sequence (UAS) and said heterologous DNA binding domain is a DNA binding domain capable of bind to said upstream activation sequence.

Item 4. The mammalian cell according any one of the preceding items, wherein said cis-acting regulatory sequence is a galactose-responsive upstream activation sequence ($UAS_G$) and said heterologous DNA binding domain is the DNA binding domain galactose-responsive transcription factor GAL4 (GAL4DB).

Item 5. The mammalian cell according any one of the preceding items, wherein said cis-acting regulatory sequence is the DNA binding site of LexA and said heterologous DNA binding domain is a DNA binding domain of repressor LexA protein.

Item 6. The mammalian cell according any one of the preceding items, wherein said cell comprises a heterologous polynucleotide comprising promoter operably linked to a down-stream open reading frame encoding a beta-Klotho protein and from which said beta-Klotho protein is expressed.

Item 7. The mammalian cell according item 6, wherein said open reading frame encoding a beta-Klotho protein has been codon-optimized for expression in said cell.

Item 8. The mammalian cell according any one of items 6 or 7, wherein said open reading frame comprises or consist of the sequence set forth in SEQ ID NO 1 or a sequence having at least 75% sequence identity to SEQ ID NO 1, such as 79% sequence identity to SEQ ID NO 1, for example 85% sequence identity to SEQ ID NO 1, such as 90% sequence identity to SEQ ID NO 1, such as 95% sequence identity to SEQ ID NO 1, for example 97% sequence identity to SEQ ID NO 1, such as 98% sequence identity to SEQ ID NO 1, for example 99% sequence identity to SEQ ID NO 1.

Item 9. The mammalian cell according any one of the preceding items, wherein said first reporter protein is an enzyme, such as a luciferase.

Item 10. The mammalian cell according any one of the preceding items, wherein said first reporter protein is a fluorescent protein.

Item 11. The mammalian cell according any one of the preceding items, wherein said cell further expresses a second reporter protein.

Item 12. The mammalian cell according any one of the preceding items, wherein said second reporter protein is expressed from a constitutive promoter.

Item 13. The cell line according to any of the preceding items, wherein said cell line is selected from the group consisting of HEK293, Jurkat, K652 and U937.

Item 14. A method for detecting and optionally quantitating FGF21 activity in a test sample, said method comprising the steps of
  (i) providing a test sample,
  (ii) contacting said test sample with the cell line according to any one of the preceding items,
  (iii) determining the activity of the first reporter protein in said cell line.

Item 15. The method of item 14, wherein said cell line expresses a second reporter protein, said method further comprising
  (iv) determining the activity of the first reporter protein in said cell line,
  (v) providing the ratio between the activity of the first reporter protein and the second reporter protein.

Item 16. A method for detecting and optionally quantitating neutralizing antibodies against FGF21 present in a test sample, said method comprising the steps of
  (i) providing a test sample comprising,
  (ii) providing a first and a second cell sample, wherein said cells samples comprises the cell line according to any one of the preceding items
  (iii) contacting the first cell sample with the test sample and subsequently with FGF21,
  (iv) contacting the second cell sample with FGF21,
  (iv) determining the activity of the first reporter protein in the cells of the first cell sample and determining the activity of the first reporter protein in the cells of the second cell sample,
  (v) provide the ratio between the reporter activity in first and a second cell sample, where a ratio (first/ second) lower than one is indicative for the presence of antibodies against FGF21 in said sample.

Item 17. A method for detecting and optionally quantitating antibodies against FGF21 present in a test sample, said method comprising the steps of
  (i) providing a test sample comprising,
  (ii) providing a first and a second cell sample, wherein said cells samples comprises the cell line according to any one of the preceding items, wherein said cell line expresses a second reporter protein
  (iii) contacting the first cell sample with the test sample and subsequently with FGF21,
  (iv) contacting the second cell sample with FGF21,
  (iv) determining the activity of the first and second reporter protein in the cells of the first cell sample and determining the activity of the first and second reporter protein in the cells of the second cell sample,
  (v) provide a first ratio between the reporter activity of the first and second reporter protein in the first cell sample, provide a second ratio between the reporter activity of the first and second reporter protein in the second cell sample
  (vi) provide a third ratio between first and second ratio of step (v), where a ratio (first/second) lower than one is indicative for the presence of antibodies against FGF21 in said sample.

The sequences set forth in SEQ ID NO: 2 to 8 relates to various polynucleotides useful for the preparation of the mammalian cell line of the present invention.

EXAMPLES

Example 1

Figure 4:
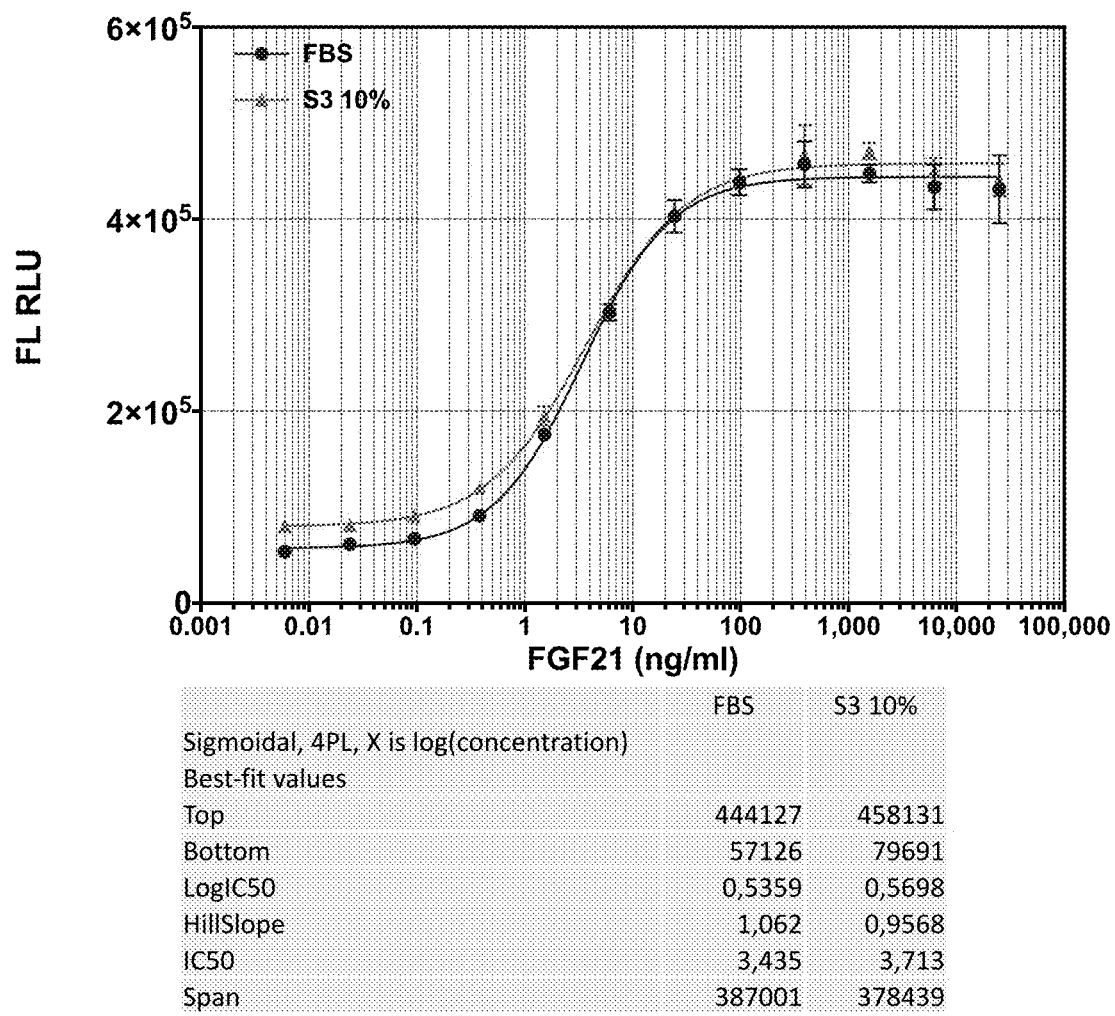
FIG. 4 illustrates the response of HEK293 cells transfected with the optimized synthetic beta-Klotho gene treated with increasing concentrations of human FGF21.

The human embryonic kidney cell line HEK293 (ATCC® CRL-1573) was co-transfected sequentially, using the FuGENE HD transfection reagent (Promega Catalogue No E2311), with a firefly luciferase (FL) reporter-gene construct regulated by a chimeric transcription factor consisting of the trans-activation domain of Elk-1 (nt 919 to nt 1275) fused to the Gal4 DNA binding domain (nt 1 to nt 390) as shown in FIG. 1. Since the gal4 DNA binding domain does not exist in mammalian cells, only the chimeric transcription factor will bind to the up-stream activation sequence (UAS) of gal4 regulating transcription of the FL reporter gene. The cells were also co-transfected with the gene encoding Renilla luciferase under the control of a constitutive promoter used to normalize FGF21 induced FL activity, and the FGFR1c receptor chain together with an optimized synthetic beta-Klotho gene (FIG. 2). The optimized synthetic beta-Klotho gene exhibits 79% homology with the native gene (FIG. 3). The nucleotide sequence of the optimized synthetic beta-Klotho gene is set forth in SEQ ID NO: 1. Stable clones were isolated and characterized for FGF21 responsiveness in the presence of increasing concentrations of human FGF21 and then sub-cloned. Suitable sub-clones were isolated, characterized and propagated, giving rise to a FGF21 responsive cell line with enhanced sensitivity relative to cell lines transfected with the native beta-Klotho gene. Thus, the resultant reporter gene cell line was found to be highly sensitive with an EC50 of approximately 3.0 ng/ml when treated with increasing concentrations of human FGF21 (FIG. 4). Human serum from a normal donor at a ¹/₁₀ final dilution did not significantly affect the response of the cells to treatment with increasing concentrations of human FGF21 (FIG. 4).

Figure 5:
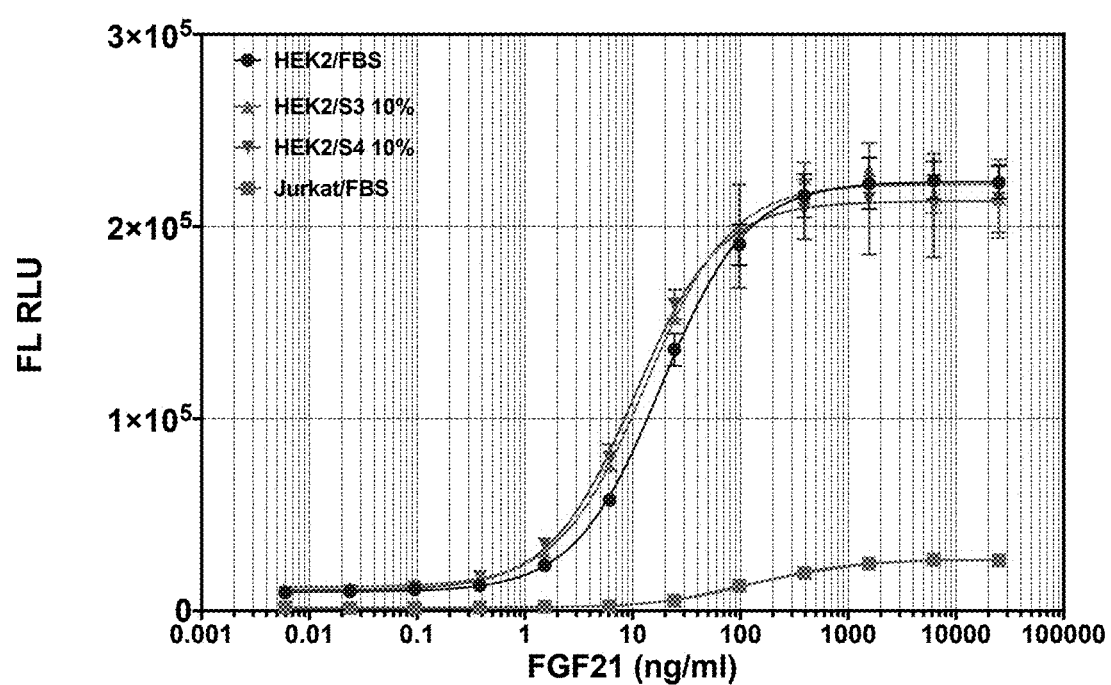
FIG. 5 illustrates the comparison of the response of HEK293 cells and Jurkat cells transfected with the optimized synthetic and native beta-Klotho genes respectively.
Figure 6A:
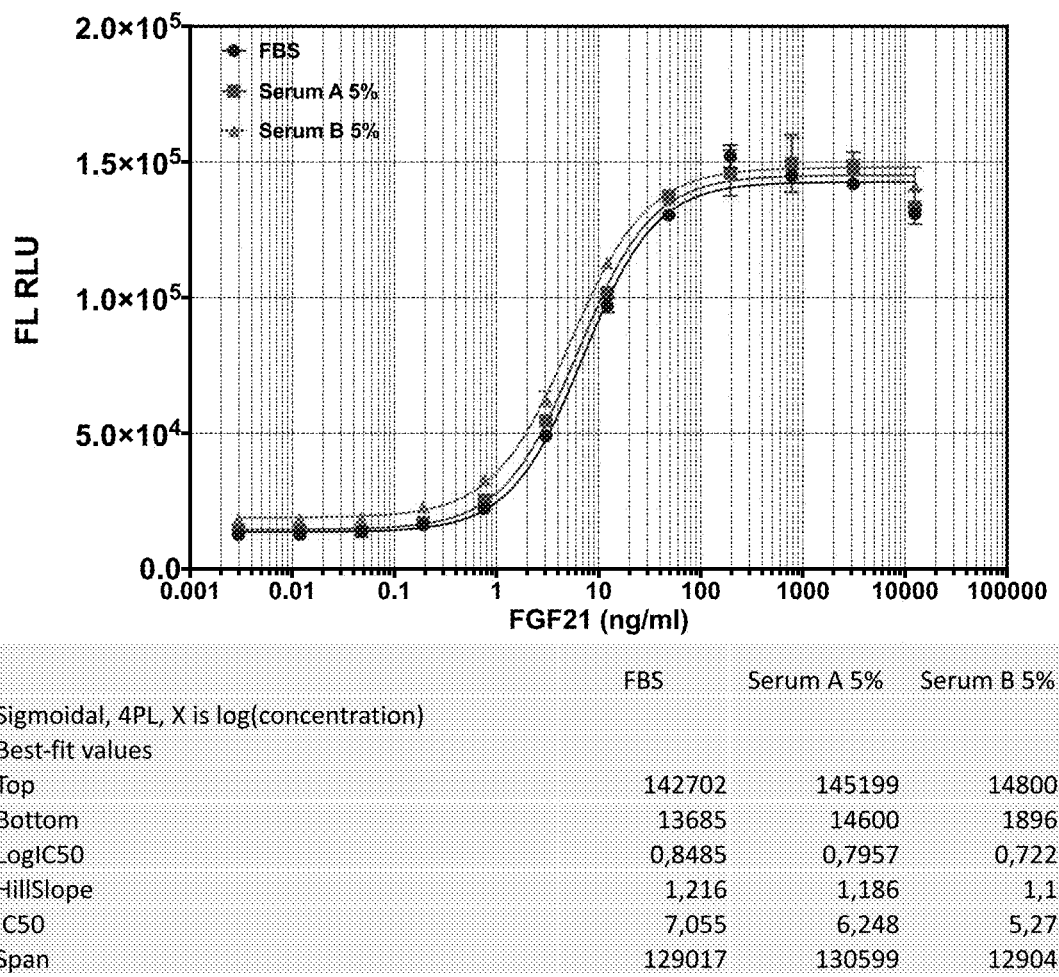
Figure 7:
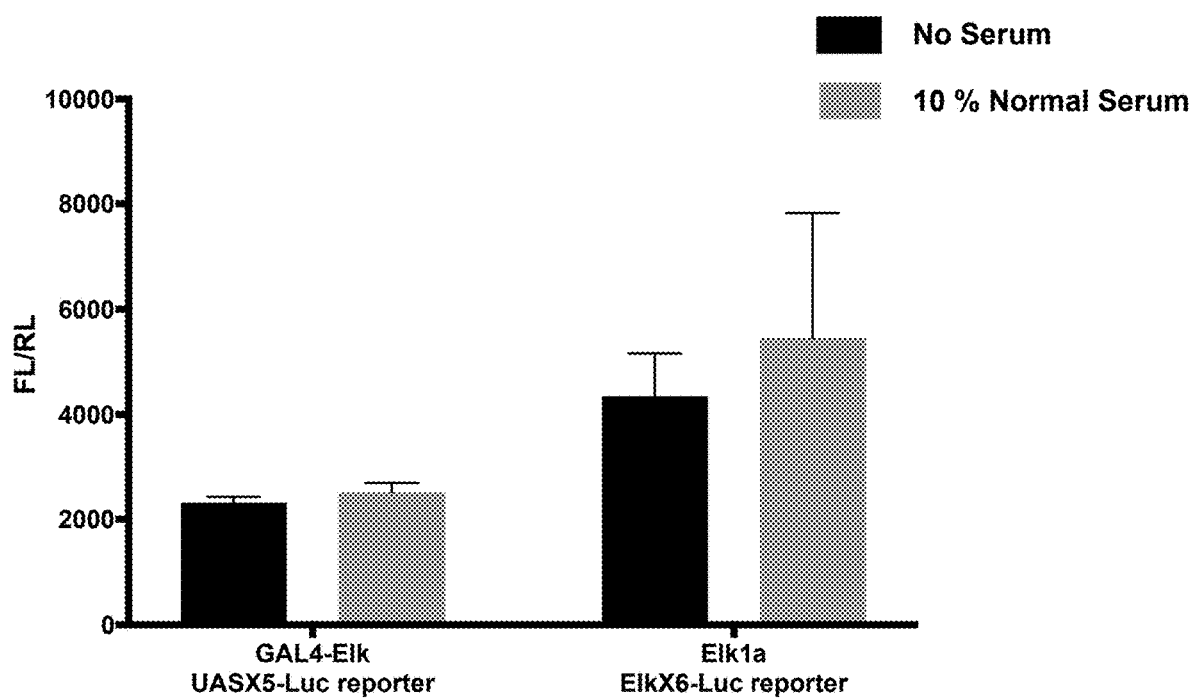
FIG. 7 illustrates the effect of normal serum on HEK293 cells transfected with the firefly luciferase reporter-gene under the control of either the chimeric gal4-Elk-1 transcription factor as described in the invention or a 6-fold tandem repeat of the canonical native Elk-1 recognition sequence (Sequence ID NO.: 8, FIG. 8).

When the FGF21 responsive HEK293 cell line with the optimized synthetic beta-Klotho gene was used in the freeze, thaw, and use, format described in U.S. Pat. No. 9,188,580 and treated with increasing concentrations of human FGF21 the response of the cells expressed as RLU of the firefly luciferase activity, was clearly superior to that observed with the FGF21 responsive Jurkat cell line transfected with the native beta-Klotho gene (FIG. 5). The FGF21 responsive HEK293 cell line with the optimized synthetic beta-Klotho gene used in the freeze, thaw, and use, format described in U.S. Pat. No. 9,188,580 exhibited an EC50 of approximately 7.0 ng/ml compared to an EC50 of approximately 24 ng/ml and 170 ng/ml for HEK293 cells and Jurkat cells respectively transfected with the native beta-Klotho gene and used in the freeze, thaw and use format described in U.S. Pat. No. 9,188,580 (Table 1). The HEK293 cell line with the optimized synthetic beta-Klotho gene used in the freeze, thaw and use format described in U.S. Pat. No. 9,188,580 exhibited no significant interference from normal human serum (FIG. 6).

REFERENCES

W Y, S., & Leung, P. S., Med. Res. Rev.; 4:672-705, 2016
Kliewer S. A, Mangelsdorf D. J. Am. J. Clin. Nutr. 91:254-257, 2010
Fisher, F. M. et al., Diabetes, 59:2781-2789.
Wang Y, Sun Z, Ageing Research Reviews 8:43-51, 2009
Wang H., et al, Cancer Res. 57:1750-1757, 1997

The invention claimed is:

1. A mammalian cell selected from HEK293, Jurkat, K652 and U937, comprising:
   (i) a first heterologous polynucleotide comprising a heterologous cis-acting regulatory sequence operably linked to a downstream promoter sequence, wherein said promoter sequence is operably linked to an open reading frame encoding a first reporter protein,
   (ii) a second heterologous polynucleotide encoding a chimeric transcription factor, wherein said chimeric transcription factor comprises a trans-activation domain of ternary complex factor (TCF) Elk-1 fused to a heterologous DNA binding domain capable of binding to said cis-acting regulatory sequence, wherein the DNA binding domain does not exist in mammalian cells, and
   (iii) a cell surface bound heterodimeric receptor protein comprising a tyrosine kinase fibroblast growth factor receptor 1c (FGFR1c) and a beta-Klotho protein,
   wherein said cell comprises a heterologous polynucleotide comprising promoter operably linked to a downstream open reading frame encoding the beta-Klotho protein and from which the beta-Klotho protein is expressed, and wherein the open reading frame in (iii) comprises the sequence set forth in SEQ ID NO: 1, and wherein the mammalian cell enables detection of FGF21 activity without interference from normal human serum.

2. The mammalian cell according to claim 1, wherein said heterologous DNA binding domain and its cognate cis-acting regulatory sequence are of yeast or bacterial origin.

3. The mammalian cell according to claim 1, wherein said cis-acting regulatory sequence is an upstream activation sequence (UAS).

4. The mammalian cell according to claim 1, wherein said cis-acting regulatory sequence is a galactose-responsive upstream activation sequence (UASG) and said heterologous DNA binding domain is the DNA binding domain of the galactose-responsive transcription factor GAL4 (GAL4DB).

5. The mammalian cell according to claim 1, wherein said cis-acting regulatory sequence is the DNA binding site of Locus for X-ray sensitivity A (LexA) and said heterologous DNA binding domain is the DNA binding domain of a repressor LexA protein.

6. The mammalian cell according to claim 1, wherein said first reporter protein is an enzyme.

7. The mammalian cell according to claim 1, wherein said first reporter protein is a luciferase.

8. The mammalian cell according to claim 1, wherein said mammalian cell further encodes a second reporter protein.

9. The mammalian cell according to claim 8, wherein said second reporter protein is expressed from a constitutive promoter.

10. The mammalian cell according to claim 1, wherein said mammalian cell is a HEK293 cell.

11. An assay method for detecting and optionally quantitating FGF21 activity in a test sample, said method comprising:
   (i) providing a test sample,
   (ii) contacting said test sample with the mammalian cell according to claim 1,
   (iii) determining the activity of the first reporter protein in said mammalian cell, wherein the assay method is without interference from normal human serum.

12. The method according to claim 11, wherein said mammalian cell expresses a second reporter protein, said method further comprising:
   (i) determining the activity of the first reporter protein in said mammalian cell; and
   (ii) providing the ratio between the activity of the first reporter protein and the second reporter protein.

13. An assay method for detecting and quantitating an FGF21 antibody in a test sample, said method comprising:
   (i) providing a test sample;
   (ii) providing a first mammalian cell and a second mammalian cell, wherein said first mammalian cell and said second mammalian cell are independently selected from the group consisting of HEK293, Jurkat, K652 and U937, comprising:
      (1) a first heterologous polynucleotide comprising a heterologous cis-acting regulatory sequence operably linked to a downstream promoter sequence, wherein said promoter sequence is operably linked to an open reading frame encoding a first reporter protein,
      (2) a second heterologous polynucleotide encoding a chimeric transcription factor, wherein said chimeric transcription factor comprises a trans-activation domain of ternary complex factor (TCF) Elk-1 fused to a heterologous DNA binding domain capable of binding to said cis-acting regulatory sequence, wherein the DNA binding domain does not exist in mammalian cells, and
      (3) a cell surface bound heterodimeric receptor protein comprising a tyrosine kinase fibroblast growth factor receptor 1c (FGFR1c) and a beta-Klotho protein,
      wherein said cell comprises a heterologous polynucleotide comprising promoter operably linked to a downstream open reading frame encoding the beta-Klotho protein and from which the beta-Klotho protein is expressed, and wherein the open reading frame in (iii) comprises the sequence set forth in SEQ ID NO.: 1;
   (iii) contacting the first mammalian cell with the test sample and subsequently with FGF21;
   (iv) contacting the second mammalian cell with FGF21;
   (v) determining the activity of the first reporter protein in the first mammalian cell and determining the activity of the first reporter protein in the second mammalian cell; and
   (vi) providing a ratio between the first reporter protein activity of the first mammalian cell and the second mammalian cell, wherein, if the ratio is less than one, then FGF21 antibodies are present in the test sample.

14. The method according to claim 13, wherein detection and quantification of an FGF21 antibody is without interference from a protein that uses the same signal transduction pathway as FGF21.

15. An assay method for detecting and quantitating an FGF21 antibody present in a test sample, said method comprising:
   (i) providing a test sample,
   (ii) providing a first mammalian cell and a second mammalian cell, wherein said first mammalian cell and said second mammalian cell are independently selected from the group consisting of HEK293, Jurkat, K652 and U937, comprising:
      (1) a first heterologous polynucleotide comprising a heterologous cis-acting regulatory sequence operably linked to a downstream promoter sequence, wherein said promoter sequence is operably linked to an open reading frame encoding a first reporter protein, (2) a second heterologous polynucleotide encoding a chimeric transcription factor, wherein said chimeric transcription factor comprises a trans-activation domain of ternary complex factor (TCF) Elk-1 fused to a heterologous DNA binding domain capable of binding to said cis-acting regulatory sequence, wherein the DNA binding domain does not exist in mammalian cells, (3) a cell surface bound heterodimeric receptor protein comprising a tyrosine kinase fibroblast growth factor receptor 1c (FGFR1c) and a beta-Klotho protein, wherein said cell comprises a heterologous polynucleotide comprising promoter operably linked to a downstream open reading frame encoding the beta-Klotho protein and from which the beta-Klotho protein is expressed, and wherein the open reading frame in (iii) comprises the sequence set forth in SEQ ID NO: 1, and (4) a third heterologous polynucleotide encoding a promoter sequence that is operably linked to an open reading frame encoding a second reporter protein;

(iii) contacting the first mammalian cell with the test sample and subsequently with FGF21;

(iv) contacting the second mammalian cell with FGF21;

(v) determining the activity of the first and second reporter proteins in the first mammalian cell and determining the activity of the first and second reporter proteins in the second mammalian cell;

(vi) providing a first ratio between the reporter activity of the first and second reporter proteins in the first mammalian cell providing a second ratio between the reporter activity of the first and second reporter proteins in the second mammalian cell; and (vii) providing a third ratio between first and second ratio of step (vi), wherein, if the ratio is less than one, then FGF21 antibodies are present in the test sample, wherein the assay method is without interference from normal human serum.

* * * * *

SEQUENCE LISTING

<160> NUMBER OF SEQ ID NOS: 8

<210> SEQ ID NO 1
<211> LENGTH: 3135
<212> TYPE: DNA
<213> ORGANISM: Artificial Sequence
<220> FEATURE:
<223> OTHER INFORMATION: betaKlotho CDS - codon optimized

<400> SEQUENCE: 1

```
atgaagcctg gatgtgccgc cggaagcccc ggcaacgagt ggatcttctt cagcaccgac      60
gagatcacca cccggtacag aaacaccatg agcaacggcg gcctgcagcg gagcgtgatc     120
ctgtctgctc tgatcctgct gagagccgtg accggcttta gcggcgacgg cagagccatc     180
tggtccaaga accccaactt caccccgtg aacgagagcc agctgttcct gtacgatacc      240
ttccccaaga acttcttctg gggcatcggc acaggcgccc tgcaggtgga aggcagctgg     300
aagaaggatg gcaagggccc cagcatctgg gaccacttca tccacaccca cctgaagaac     360
gtgtccagca ccaacggcag cagcgacagc tacatcttcc tggaaaagga cctgagcgcc     420
ctggacttca tcggcgtgtc cttctaccag ttcagcatca gctggcccag actgttcccc     480
gacggcatcg tgacagtggc caatgccaag ggcctgcagt actacagcac cctgctggac     540
gccctggtgc tgagaaacat cgagcccatc gtgaccctgt accactggga cctgccactg     600
gctctgcagg agaaatacgg cggctggaaa aacgacacca tcatcgacat cttcaacgac     660
tacgccacct actgcttcca gatgttcggc gacagagtga agtactggat caccatccac     720 aaccctacc tggtggcctg gcacggctat ggcaccggaa tgcatgcccc tggcgagaag     780
ggaaatctgg ccgccgtgta caccgtgggc cacaacctga tcaaggccca cagcaaagtg     840
tggcacaact acaacaccca cttccggccc caccagaagg gctggctgtc tatcacactg     900
ggcagccact ggatcgagcc taaccgcagc gagaacacca tggatatctt caagtgccag     960
cagagcatgg tgtccgtgct gggatggttc gccaacccca ttcatggcga cggcgactac    1020
cccgagggca tgcggaagaa actgttcagc gtgctgccca tcttcagcga ggccgagaag    1080
cacgagatgc ggggcaccgc cgatttcttc gcctttagct tcggccccaa caacttcaag    1140 ccctgaata ccatggccaa gatgggccag aatgtgtccc tgaacctgag agaggccctg    1200
aactggatca agctggagta caacaacccc cggatcctga tcgccgagaa cggctggttc    1260
accgacagca gagtgaaaac cgaggacacc accgccatct atatgatgaa gaacttcctg    1320
agccaggtgc tgcaggctat ccggctggat gagatccggg tgttcggcta cacagcctgg    1380
tcactgctgg atggcttcga gtggcaggac gcctacacca tcagacgggg cctgttctac    1440
gtggacttca acagcaagca gaaagagcgg aagcccaaga gcagcgccca ctactacaag    1500
```

```
cagatcatca gagagaatgg cttcagcctg aaagaaagca ccccccgacgt gcagggccag    1560 ttccccctgtg atttttcctg gggcgtgacc gagagcgtgc tgaagcctga gtctgtggcc    1620
tccagccccc agtttagcga ccccccacctg tacgtgtgga acgccaccgg caaccggctg    1680
ctgcatagag tggaaggcgt gcggctgaaa accagacccg cccagtgcac cgacttcgtg    1740
aacatcaaga aacagctgga aatgctggcc cggatgaaag tgacccacta cagattcgcc    1800
ctggattggg cctccgtgct gcctaccgga aacctgtctg ccgtgaacag acaggccctg    1860
aggtactaca gatgcgtggt gtccgagggc ctgaagctgg gcatcagcgc catggtcaca    1920
ctgtactacc ccacccacgc ccacctggga ctgcctgaac tctgctgca tgccgacggc    1980 tggctgaatc cttctacagc cgaggccttc caggcctacg ccggactgtg ctttcaggaa    2040
ctgggcgacc tcgtgaagct gtggatcaca atcaacgagc ccaacagact gagcgacatc    2100
tacaacagaa gcggcaacga cacctacggc gctgcccaca atctgctggt ggctcatgcc    2160
ctggcctggc ggctgtacga cagacagttc agaccaagcc agcggggagc cgtgtctctg    2220
tctctgcatg ctgattgggc cgagcccgcc aacccttacg ccgactctca ttggagagcc    2280
gccgagcggt tcctgcagtt cgagatcgct tggtttgccg agcccctgtt caagaccggc    2340 gattacccctg ccgccatgag agagtatatc gccagcaagc acagaagagg cctgagcagc    2400
tccgccctgc ctagactgac agaggccgaa aggcggctgc tgaagggcac cgtggatttc    2460
tgtgccctga atcacttcac caccagattc gtgatgcacg agcagctggc cggcagcaga    2520
tacgacagcg accgggacat ccagtttctg caggacatca cccggctgag cagccctaca    2580
agactggccg tgatccccttg gggcgtgcgg aagctgctga gatgggtgcg cagaaactac    2640
ggcgacatgg acatctatat caccgccagc ggcatcgacg accaggccct ggaagatgac    2700
cggctgcgga gtactaccct gggcaagtac ctgcaggaag tgctgaaggc ctacctgatc    2760
gacaaagtgc ggatcaaggg ctactacgcc ttcaagctgg ccgaggaaaa gagcaagccc    2820
agattcggct tcttccaccag cgacttcaag gccaagtcca gcatccagtt ctacaacaaa    2880
gtgatcagca gcaggggctt cccattcgag aacagcagca gcagatgcag ccagacacag    2940
gaaaacaccg agtgtaccgt gtgcctgttc ctggtgcaga agaagcctct gatctttctg    3000
ggctgctgct ctttagcac actggtgctg ctgctgagca ttgccatctt tcagcggcag    3060
aagcggagaa agttttggaa ggccaagaat ctgcagcaca tccccctgaa aaagggcaag    3120
cgggtggtgt cttga                                                     3135

<210> SEQ ID NO 2
<211> LENGTH: 5276
<212> TYPE: DNA
<213> ORGANISM: Artificial Sequence
<220> FEATURE:
<223> OTHER INFORMATION: [ptk-nl1.3 blas] ligation of : ptk-nl1.3-
      neo.xdna [4208 nt] : (sali[3262] / kpn2i[2356]) to pcr
      brs-p(a)betaglo to ptknl.xdna [1060 nt] : (kpn2i[11] /
      sali[1075]) - 5276 bp

<400> SEQUENCE: 2
tctcctaatt ccttaattta atacttattc tgataatgat aactaaaaga tctaaatgag      60
tcttcggacc tcgcggggc cgcttaagcg gtggttaggg tttgtctgac gcggggggag     120
ggggaaggaa cgaaacactc tcattcggag gcggctcggg gtttggtctt ggtggccacg     180
ggcacgcaga agagcgccgc gatcctctta agcaccccccc cgccctccgt ggaggcgggg     240
gtttggtcgg cgggtggtaa ctggcgggcc gctgactcgg gcgggtcgcg cgccccagag     300
```

```
tgtgaccttt tcggtctgct cgcagacccc cgggcggcgc cgccgcggcg gcgacgggct    360
cgctgggtcc taggctccat ggggaccgta tacgtggaca ggctctggag catccgcacg    420
actgcggtga tattaccgga gaccttctgc gggacgagcc gggtcacgcg gctgacgcgg    480
agcgtccgtt gggcgacaaa caccaggacg gggcacaggt acactatctt gtcacccgga    540
ggcgcgaggg actgcaggag cttcagggag tggcgcagct gcttcatccc cgtggcccgt    600
tgctcgcgtt tgctggcggt gtccccggaa gaaatatatt tgcatgtctt tagttctatg    660
atgacacaaa ccccgcccag cgtcttgtca ttggcgaatt cgaacacgca gatgcagtcg    720
gggcggcgcg gtcccaggtc cacttcgcat attaaggtga cgcgtgtggc ctcgaacacc    780
gagcgaccct gcagcgaccc gcttaaaagc ttgattcttc tgacacaaca gtctcgaact    840
taagctgcag aagttggtcg tgaggcactg ggcaggtaag tatcaaggtt acaagacagg    900
tttaaggaga ccaatagaaa ctgggcttgt cgagacagag aagactcttg cgtttctgat    960
aggcacctat tggtcttact gacatccact ttgcctttct ctccacaggt gtccactccc    1020
agttcaatta cagctcttaa ggctagagta cttaatacga ctcactatag gctagcgcca    1080
ccatgaactc cttctccaca agcgccttcg gtccagttgc cttctccctg ggcctgctcc    1140
tggtgttgcc tgctgccttc cctgcccag tcttcacact cgaagatttc gttggggact    1200
ggcgacagac agccggctac aacctggacc aagtccttga acagggaggt gtgtccagtt    1260
tgtttcagaa tctcggggtg tccgtaactc cgatccaaag gattgtcctg agcggtgaaa    1320
atgggctgaa gatcgacatc catgtcatca tcccgtatga aggtctgagc ggcgaccaaa    1380
tgggccagat cgaaaaaatt tttaaggtgg tgtaccctgt ggatgatcat cactttaagg    1440
tgatcctgca ctatggcaca ctggtaatcg acggggttac gccgaacatg atcgactatt    1500
tcggacggcc gtatgaaggc atcgccgtgt tcgacggcaa aaagatcact gtaacaggga    1560
ccctgtggaa cggcaacaaa attatcgacg agcgcctgat caaccccgac ggctccctgc    1620
tgttccgagt aaccatcaac ggagtgaccg gctggcggct gtgcgaacgc attctggcgt    1680
aagcggccgc ttcgagcaga catgataaga tacattgatg agtttggaca aaccacaact    1740
agaatgcagt gaaaaaaatg ctttatttgt gaaatttgtg atgctattgc tttatttgta    1800
accattataa gctgcaataa acaagttaac aacaacaatt gcattcattt tatgtttcag    1860
gttcaggggg aggtgtggga ggttttttaa agcaagtaaa acctctacaa atgtggtaaa    1920
atcgataagg atccccgggt aggggaggcg cttttcccaa ggcagtctgg agcatgcgct    1980
ttagcagccc cgctgggcac ttggcgctac acaagtggcc tctggcctcg cacacattcc    2040
acatccaccg gtaggcgcca accggctccg ttctttggtg gccccttcgc gccaccttct    2100
actcctcccc tagtcaggaa gttccccccc gccccgcagc tcgcgtcgtg caggacgtga    2160
caaatggaag tagcacgtct cactagtctc gtgcagatgg acagcaccgc tgagcaatgg    2220
aagcgggtag gcctttgggg cagcggccaa tagcagcttt gctccttcgc tttctgggct    2280
cagaggctgg aaggggtgg gtccggggc gggctcaggg gcgggctcag gggcggggcg    2340
ggcgcccgaa ggtcctccgg aatgaagacc ttcaacatct ctcagcagga tctggagctg    2400
gtggaggtcg ccactgagaa gatcaccatg ctctatgagg acaacaagca ccatgtcggg    2460
gcggccatca ggaccaagac tggggagatc atctctgctg tccacattga ggcctacatt    2520
ggcagggtca ctgtctgtgc tgaagccatt gccattgggt ctgctgtgag caacgggcag    2580
aaggactttg acaccattgt ggctgtcagg caccccact ctgatgaggt ggacagatcc    2640
atcagggtgg tcagcccctg tggcatgtgc agagagctca tctctgacta tgctcctgac    2700
```

```
tgctttgtgc tcattgagat gaatggcaag ctggtcaaaa ccaccattga ggaactcatc    2760
cccctcaagt acaccaggaa ctaaagctag aagctcgctt tcttgctgtc caatttctat    2820
taaaggttcc tttgttccct aagtccaact actaaactgg gggatattat gaagggcctt    2880
gagcatctgg attctgccta ataaaaaaca tttattttca ttgcaatgat gtatttaaat    2940
tatttctgaa tattttacta aaagggaat gtgggaggtc agtgcattta aaacataaag     3000
aaatgaagag ctagttcaaa ccttgggaaa atacactata tcttaaactc catgaaagaa    3060
ggtgaggctg caaacagcta atgcacattg gcaacagccc ctgatgccta tgccttattc    3120
atccctcaga aaaggattca agtagaggct tgatttggag gttaaagttt tgctatgctg    3180
tattttagaa ttccatacca catttgtaga ggttttactt gctttaaaaa acctcccaca    3240 cctcccctg aacctgaaac ataaaatgaa tgcaattgtt gttgttaact tgtttattgc     3300
agcttataat ggttacaaat aaagcaatag catcacaaat ttcacaaata aagcattttt    3360
ttcactgcat tctagttgtg gtttgtccaa actcatcaat gtatcttatc atgtctggcg    3420
tcgacctgca gccaagctta tcgataaaat aaaggatcca ggtggcactt ttcggggaaa    3480
tgtgcgcgga acccctattt gtttattttt ctaaatacat tcaaatatgt atccgctcat    3540
gagacaataa ccctgataaa tgcttcaata atattgaaaa aggaagagta tgagtattca    3600
acatttccgt gtcgccctta ttccctttt tgcggcattt tgccttcctg ttttgctca     3660 cccagaaacg ctggtgaaag taaaagatgc tgaagatcag ttgggtgcac gagtgggtta    3720
catcgaactg gatctcaaca gcggtaagat ccttgagagt tttcgccccg aagaacgttt    3780
tccaatgatg agcacttta aagttctgct atgtggcgcg gtattatccc gtattgacgc     3840
cgggcaagag caactcggtc gccgcataca ctattctcag aatgacttgg ttgagtactc    3900
accagtcaca gaaaagcatc ttacggatgg catgacagta agagaattat gcagtgctgc    3960
cataaccatg agtgataaca ctgcggccaa cttacttctg acaacgatcg gaggaccgaa    4020
ggagctaacc gcttttttgc acaacatggg ggatcatgta actcgccttg atcgttggga    4080
accggagctg aatgaagcca taccaaacga cgagcgtgac accacgatgc ctgtagcaat    4140
ggcaacaacg ttgcgcaaac tattaactgg cgaactactt actctagctt cccggcaaca    4200
attaatagac tggatggagg cggataaagt tgcaggacca cttctgcgct cggcccttcc    4260
ggctggctgg tttattgctg ataaatctgg agccggtgag cgtgggtctc gcggtatcat    4320
tgcagcactg gggccagatg gtaagccctc ccgtatcgta gttatctaca cgacggggag    4380
tcaggcaact atggatgaac gaaatagaca gatcgctgag ataggtgcct cactgattaa    4440
gcattggtaa ctgtcagacc aagtttactc atatatactt tagattgatt taaaacttca    4500
tttttaattt aaaaggatct aggtgaagat cctttttgat aatctcatga ccaaaatccc    4560
ttaacgtgag ttttcgttcc actgagcgtc agaccccgta gaaaagatca aaggatcttc    4620
ttgagatcct ttttttctgc gcgtaatctg ctgcttgcaa acaaaaaaac caccgctacc    4680
agcggtggtt tgtttgccgg atcaagagct accaactctt tttccgaagg taactggctt    4740
cagcagagcg cagataccaa atactgttct tctagtgtag ccgtagttag gccaccactt    4800
caagaactct gtagcaccgc ctacatacct cgctctgcta atcctgttac cagtggctgc    4860
tgccagtggc gataagtcgt gtcttaccgg gttggactca agacgatagt taccggataa    4920
ggcgcagcgg tcgggctgaa cggggggttc gtgcacacag cccagcttgg agcgaacgac    4980
ctacaccgaa ctgagatacc tacagcgtga gctatgagaa agcgccacgc ttcccgaagg    5040
```

```
gagaaaggcg acaggtatc cggtaagcgg cagggtcgga acaggagagc gcacgaggga    5100
gcttccaggg ggaaacgcct ggtatcttta tagtcctgtc gggtttcgcc acctctgact    5160
tgagcgtcga ttttgtgat gctcgtcagg ggggcggagc ctatggaaaa acgccagcaa    5220
cgcggccttt ttacggttcc tggccttttg ctggcctttt gctcacatgg ctcgac       5276
```

<210> SEQ ID NO 3
<211> LENGTH: 7109
<212> TYPE: DNA
<213> ORGANISM: Artificial Sequence
<220> FEATURE:
<223> OTHER INFORMATION: [pB-GAL4-Elk1a-PEST zeo ] Ligation of :
      piggyBac carrier [5285 nt] : (AccI[2903] / BamHI[1737]) to PCR
      GAL4Elk1a-PEST zeo [1818 nt] : (BamHI[11] / AccI[1832]) - 7109 bp

<400> SEQUENCE: 3

```
actcttcctt tttcaatatt attgaagcat ttatcagggt tattgtctca tgagcggata     60
catatttgaa tgtatttaga aaaataaaca aataggggtt ccgcgcacat ttccccgaaa    120
agtgccacct aaattgtaag cgttaatatt ttgttaaaat tcgcgttaaa ttttgttaa    180 atcagctcat tttttaacca ataggccgaa atcggcaaaa tcccttataa atcaaaagaa    240
tagaccgaga tagggttgag tgttgttcca gtttggaaca agagtccact attaaagaac    300
gtggactcca acgtcaaagg gcgaaaaacc gtctatcagg gcgatggccc actacgtgaa    360
ccatcaccct aatcaagttt tttggggtcg aggtgccgta aagcactaaa tcggaaccct    420
aaagggagcc cccgatttag agcttgacgg ggaaagccgg cgaacgtggc gagaaaggaa    480
gggaagaaag cgaaaggagc gggcgctagg gcgctggcaa gtgtagcggt cacgctgcgc    540
gtaaccacca cacccgccgc gcttaatgcg ccgctacagg gcgcgtccca ttcgccattc    600
aggctgcgca actgttggga agggcgatcg gtgcgggcct cttcgctatt acgccagctg    660
gcgaaagggg gatgtgctgc aaggcgatta agttgggtaa cgccagggtt ttcccagtca    720
cgacgttgta aaacgacggc cagtgagcgc gcctcgttca ttcacgtttt tgaacccgtg    780
gaggacgggc agactcgcgg tgcaaatgtg ttttacagcg tgatggagca gatgaagatg    840
ctcgacacgc tgcagaacac gcagctagat taaccctaga aagataatca tattgtgacg    900
tacgttaaag ataatcatgt gtaaaattga cgcatgtgtt ttatcggtct gtatatcgag    960
gtttatttat taatttgaat agatattaag ttttattata tttacactta catactaata   1020
ataaattcaa caaacaattt atttatgttt atttatttat taaaaaaaac aaaaactcaa   1080
aatttcttct ataaagtaac aaaacttttta tgagggacag ccccccccca aagcccccag   1140
ggatgtaatt acgtccctcc cccgctaggg ggcagcagcg agccgcccgg ggctccgctc   1200
cggtccggcg ctccccccgc atccccgagc cggcagcgtg cggggacagc ccgggcacgg   1260
ggaaggtggc acgggatcgc tttcctctga acgcttctcg ctgctctttg agcctgcaga   1320
cacctggggg gatacgggga aaaggcctcc acgccactag tattatgcc cagtacatga    1380 ccttatggga ctttcctact tggcagtaca tctacgtatt agtcatcgct attaccatgg   1440
tgatgcggtt ttggcagtac atcaatgggc gtggatagcg gtttgactca cggggatttc   1500
caagtctcca ccccattgac gtcaatggga gtttgttttg gcaccaaaat caacgggact   1560
ttccaaaatg tcgtaacaac tccgccccat tgacgcaaat gggcggtagg cgtgtacggt   1620
gggaggttta taagcagag gctgctttag tgaaccgtca gatcgcctgg agacgccatc   1680
cacgctgttt tgacctccat agaagattct agagctagcg aattcgaatt taaatcggat   1740
ccgttaacga attcgccacc atgaagctgc tgagtagtat tgaacaagcg tgtgacatat   1800
```

```
gccgacttaa gaagctgaag tgcagcaagg aaaagccgaa gtgcgccaaa tgtcttaaga    1860
acaattggga gtgccggtac tcgccaaaga cgaagcgaag ccctttgaca cgcgctcatt    1920
tgactgaagt ggagagtcgc ctggagcgcc ttgagcagtt gttcctcctc attttccccc    1980
gtgaagacct cgacatgata ctgaagatgg atagtctcca agatattaag gccctgctca    2040
ctggcctgtt tgttcaggat aacgtcaaca aggatgccgt gacggaccgc cttgcctcgg    2100
tggagacaga tatgccactt accttgcggc agcatcgcat ctcggctacc atctcccagc    2160
cgcagaaggg ccggaagccc cgggacctag agcttccact cagcccgagc ctgctaggtg    2220
ggccgggacc cgaacggacc ccaggatcgg gaagtggctc cggcctccag gctccggggc    2280
cggcgctgac cccatccctg cttcctacgc atacattgac cccggtgctg ctgacaccca    2340
gctcgctgcc tcctagcatt cacttctgga gcaccctgag tcccattgcg ccccgtagcc    2400
cggccaagct ctccttccag tttccatcca gtggcagcgc ccaggtgcac atcccttcta    2460
tcagcgtgga tggcctctcg accccgtgg tgctctcccc agggccctct cacggctttc    2520
cgcctgaggt tgaagagcaa gccgccggta cattgccgat gtcctgcgca caagaaagcg    2580
gtatggaccg gcacccagcc gcttgtgctt cagctcgcat caacgtctaa gcttccagaa    2640
gccatgagaa ttctaccggg taggggaggc gcttttccca aggcagtctg gagcatgcgc    2700
tttagcagcc ccgctgggca cttggcgcta cacaagtggc ctctggcctc gcacacattc    2760
cacatccacc ggtaggcgcc aaccggctcc gttctttggt ggccccttcg cgccaccttc    2820
tactcctccc ctagtcagga agttcccccc cgccccgcag ctcgcgtcgt gcaggacgtg    2880
acaaatggaa gtagcacgtc tcactagtct cgtgcagatg gacagcaccg ctgagcaatg    2940
gaagcgggta ggccttggg gcagcggcca atagcagctt tgctccttcg ctttctgggc    3000
tcagaggctg ggaaggggtg ggtccggggg cgggctcagg ggcgggctca ggggcggggc    3060
gggcgcccga aggtcctccg gaggcccggc attctgcacg cttcaaaagc gcacgtctgc    3120
cgcgctgttc tcctcttcct catctccggg cctttcgacc tgcagcccaa gcttatggcc    3180
aagttgacca gtgccgttcc ggtgctcacc gcgcgcgacg tcgccggagc ggtcgagttc    3240
tggaccgacc ggctcgggtt ctcccgggac ttcgtggagg acgacttcgc cggtgtggtc    3300
cgggacgacg tgaccctgtt catcagcgcg gtccaggacc aggtggtgcc ggacaacacc    3360
ctggcctggg tgtgggtgcg cggcctggac gagctgtacg ccgagtggtc ggaggtcgtg    3420
tccacgaact tccgggacgc ctccgggccg gccatgaccg agatcggcga gcagccgtgg    3480
gggcgggagt tcgccctgcg cgacccggcc ggcaactgcg tgcacttcgt ggccgaggag    3540
caggactgaa tgcatcggtc gacaatcaac ctctggatta caaaatttgt gaaagattga    3600
ctggtattct taactatgtt gctccttta cgctatgtgg atacgctgct ttaatgcctt    3660
tgtatcatgc gttaactaaa cttgtttatt gcagcttata atggttacaa ataaagcaat    3720
agcatcacaa atttcacaaa taaagcattt ttttcactgc attctagttg tggtttgtcc    3780
aaactcatca atgtatctta tcatgtctgg aattgactca aatgatgtca attagtctat    3840
cagaagctca tctggtctcc cttccggggg acaagacatc cctgtttaat atttaaacag    3900
cagtgttccc aaactgggtt cttatatccc ttgctctggt caaccaggtt gcagggtttc    3960
ctgtcctcac aggaacgaag tccctaaaga aacagtggca gccaggttta gccccggaat    4020
tgactggatt ccttttttag ggcccattgg tatggctttt tccccgtatc ccccaggtg    4080 tctgcaggct caaagagcag cgagaagcgt tcagaggaaa gcgatcccgt gccaccttcc    4140
```

-continued

```
ccgtgcccgg gctgtccccg cacgctgccg gctcgggat gcggggggag cgccggaccg    4200
gagcggagcc ccgggcggct cgctgctgcc ccctagcggg ggagggacgt aattacatcc    4260
ctgggggctt tggggggggg ctgtccctga tatctataac aagaaaatat atatataata    4320
agttatcacg taagtagaac atgaaataac aatataatta tcgtatgagt taaatcttaa    4380
aagtcacgta aaagataatc atgcgtcatt ttgactcacg cggtcgttat agttcaaaat    4440
cagtgacact taccgcattg acaagcacgc ctcacgggag ctccaagcgg cgactgagat    4500
gtcctaaatg cacagcgacg gattcgcgct atttagaaag agagagcaat atttcaagaa    4560
tgcatgcgtc aattttacgc agactatctt tctagggtta atctagctgc atcaggatca    4620
tatcgtcggg tctttttttcc ggctcagtca tcgcccaagc tggcgctatc tgggcatcgg    4680
ggaggaagaa gcccgtgcct tttcccgcga ggttgaagcg gcatgaaaag agtttgccga    4740
ggatgactgc tgctgcattg acgttgagcg aaaacgcacg tttaccatga tgattcggga    4800
aggtgtggcc atgcacgcct ttaacggtga actgttcgtt caggccacct gggataccag    4860
ttcgtcgcgg ctttttccgga cacagttccg gatggtcagc ccgaagcgca tcagcaaccc    4920
gaacaatacc ggcgacagcc ggaactgccg tgccggtgtg cagattaatg acagcggtgc    4980
ggcgctggga tattacgtca gcgaggacgg gtatcctggc tggatgccgc agaaatggac    5040
atggatcccc cgtgagttac ccggcgggcg cgcttggcgt aatcatggtc atagctgttt    5100
cctgtgtgaa attgttatcc gctcacaatt ccacacaaca tacgagccgg aagcataaag    5160
tgtaaagcct ggggtgccta atgagtgagc taactcacat taattgcgtt gcgctcactg    5220
cccgctttcc agtcgggaaa cctgtcgtgc cagctgcatt aatgaatcgg ccaacgcgcg    5280
gggagaggcg gtttgcgtat tgggcgctct tccgcttcct cgctcactga ctcgctgcgc    5340
tcggtcgttc ggctgcggcg agcggtatca gctcactcaa aggcggtaat acggttatcc    5400
acagaatcag gggataacgc aggaaagaac atgtgagcaa aaggccagca aaaggccagg    5460
aaccgtaaaa aggccgcgtt gctggcgttt ttccataggc tccgcccccc tgacgagcat    5520
cacaaaaatc gacgctcaag tcagaggtgg cgaaacccga caggactata agataccag    5580
gcgtttcccc ctggaagctc cctcgtgcgc tctcctgttc cgaccctgcc gcttaccgga    5640
tacctgtccg cctttctccc ttcgggaagc gtggcgcttt ctcatagctc acgctgtagg    5700
tatctcagtt cggtgtaggt cgttcgctcc aagctgggct gtgtgcacga acccccgtt    5760
cagcccgacc gctgcgcctt atccggtaac tatcgtcttg agtccaaccc ggtaagacac    5820
gacttatcgc cactggcagc agccactggt aacaggatta gcagagcgag gtatgtaggc    5880
ggtgctacag agttcttgaa gtggtggcct aactacggct acactagaag gacagtattt    5940
ggtatctgcg ctctgctgaa gccagttacc ttcggaaaaa gagttggtag ctcttgatcc    6000
ggcaaacaaa ccaccgctgg tagcggtggt ttttttgttt gcaagcagca gattacgcgc    6060
agaaaaaaag gatctcaaga agatcctttg atcttttcta cggggtctga cgctcagtgg    6120
aacgaaaact cacgttaagg gattttggtc atgagattat caaaaaggat cttcacctag    6180
atccttttaa attaaaaatg aagttttaaa tcaatctaaa gtatatatga gtaaacttgg    6240
tctgacagtt accaatgctt aatcagtgag gcacctatct cagcgatctg tctatttcgt    6300
tcatccatag ttgcctgact ccccgtcgtg tagataacta cgatacggga gggcttacca    6360
tctggcccca gtgctgcaat gataccgcga gacccacgct caccggctcc agatttatca    6420
gcaataaacc agccagccgg aagggccgag cgcagaagtg gtcctgcaac tttatccgcc    6480
tccatccagt ctattaattg ttgccgggaa gctagagtaa gtagttcgcc agttaatagt    6540
```

```
ttgcgcaacg ttgttgccat tgctacaggc atcgtggtgt cacgctcgtc gtttggtatg      6600
gcttcattca gctccggttc ccaacgatca aggcgagtta catgatcccc catgttgtgc      6660
aaaaaagcgg ttagctcctt cggtcctccg atcgttgtca gaagtaagtt ggccgcagtg      6720
ttatcactca tggttatggc agcactgcat aattctctta ctgtcatgcc atccgtaaga      6780
tgcttttctg tgactggtga gtactcaacc aagtcattct gagaatagtg tatgcggcga      6840
ccgagttgct cttgcccggc gtcaatacgg gataataccg cgccacatag cagaacttta      6900
aaagtgctca tcattggaaa acgttcttcg gggcgaaaac tctcaaggat cttaccgctg      6960
ttgagatcca gttcgatgta acccactcgt gcacccaact gatcttcagc atcttttact      7020
ttcaccagcg tttctgggtg agcaaaaaca ggaaggcaaa atgccgcaaa aagggaata       7080 agggcgacac ggaaatgttg aatactcat                                         7109
```

<210> SEQ ID NO 4
<211> LENGTH: 9336
<212> TYPE: DNA
<213> ORGANISM: Artificial Sequence
<220> FEATURE:
<223> OTHER INFORMATION: [pB-hFGFR1c puro] Ligation of : piggyBac carrier [6093 nt] : (NheI[1714] / SpeI[1357]) to PCR hFGFR to pB.xdna [3235 nt] : (SpeI[11] / NheI[3250]) - 9336 bp

<400> SEQUENCE: 4

```
actcttcctt tttcaatatt attgaagcat ttatcagggt tattgtctca tgagcggata        60
catatttgaa tgtatttaga aaataaaca aatagggggtt ccgcgcacat ttccccgaaa       120
agtgccacct aaattgtaag cgttaatatt tgttaaaat tcgcgttaaa ttttgttaa         180 atcagctcat tttttaacca ataggccgaa atcggcaaaa tcccttataa atcaaaagaa       240
tagaccgaga tagggttgag tgttgttcca gtttggaaca agagtccact attaaagaac       300
gtggactcca acgtcaaagg gcgaaaaacc gtctatcagg gcgatggccc actacgtgaa       360
ccatcaccct aatcaagttt tttggggtcg aggtgccgta aagcactaaa tcggaaccct       420
aaagggagcc cccgatttag agcttgacgg ggaaagccgg cgaacgtggc gagaaaggaa       480
gggaagaaag cgaaaggagc gggcgctagg gcgctggcaa gtgtagcggt cacgctgcgc       540
gtaaccacca cacccgccgc gcttaatgcg ccgctacagg gcgcgtccca ttcgccattc       600
aggctgcgca actgttggga agggcgatcg gtgcgggcct cttcgctatt acgccagctg       660
gcgaaagggg gatgtgctgc aaggcgatta agttgggtaa cgccagggtt ttcccagtca       720
cgacgttgta aaacgacggc cagtgagcgc gcctcgttca ttcacgtttt tgaacccgtg       780
gaggacgggc agactcgcgg tgcaaatgtg ttttacagcg tgatggagca gatgaagatg       840
ctcgacacgc tgcagaacac gcagctagat taacctaga aagataatca tattgtgacg       900
tacgttaaag ataatcatgt gtaaaattga cgcatgtgtt ttatcggtct gtatatcgag       960
gtttatttat taatttgaat agatattaag ttttattata tttacactta catactaata      1020
ataaattcaa caaacaattt atttatgttt atttatttat taaaaaaaac aaaaactcaa      1080
aatttcttct ataaagtaac aaaactttta tgagggacag cccccccca aagccccag       1140 ggatgtaatt acgtccctcc cccgctaggg ggcagcagcg agccgccgg ggctccgctc       1200 cggtccggcg ctccccccgc atccccgagc cggcagcgtg cggggacagc ccgggcacgg      1260
ggaaggtggc acgggatcgc tttcctctga acgcttctcg ctgctctttg agcctgcaga      1320
cacctggggg gatacgggga aaaggcctcc acggccacta gtgtgccacc tgacgtctaa      1380
```

```
gaaaccatta ttatcatgac attaacctat aaaaataggc gtagtacgag gcccttttcac   1440 tcattagatg catgtcgtta cataacttac ggtaaatggc ccgcctggct gaccgcccaa   1500
cgacccccgc ccattgacgt caataatgac gtatgttccc atagtaacgc caatagggac   1560
tttccattga cgtcaatggg tggagtattt acggtaaact gcccacttgg cagtacatca   1620
agtgtatcat atgccaagta cgccccctat tgacgtcaat gacggtaaat ggcccgcctg   1680
gcattatgcc cagtacatga ccttatggga cttttcctact tggcagtaca tctacgtatt   1740
agtcatcgct attaccatgg tgatgcggtt ttggcagtac atcaatgggc gtggatagcg   1800
gtttgactca cggggatttc caagtctcca ccccattgac gtcaatggga gtttgttttg   1860
gcaccaaaat caacgggact ttccaaaatg tcgtaacaac tccgccccat tgacgcaaat   1920
gggcggtagg cgtgtacggt gggaggtcta tataagcaga gctcgtttag tgaaccgtca   1980
gatcgcctgg agacgccatc cacgctgttt tgacctccat agaagacacc gggaccgatc   2040
cagcctccgg actctagcct agatcttcga gaacaagtt tgtacaaaaa agcaggcttg   2100
gaaggagttc gaaccatgtg gagctggaag tgcctcctct tctgggctgt gctggtcaca   2160
gccacactct gcaccgctag gccgtccccg accttgcctg aacaagccca gccctgggga   2220
gcccctgtgg aagtggagtc cttcctggtc caccccggtg acctgctgca gcttcgctgt   2280
cggctgcggg acgatgtgca gagcatcaac tggctgcggg acggggtgca gctggcggaa   2340
agcaaccgca cccgcatcac aggggaggag gtggaggtgc aggactccgt gcccgcagac   2400
tccggcctct atgcttgcgt aaccagcagc cctcgggca gtgacaccac ctacttctcc   2460
gtcaatgttt cagatgctct cccctcctcg gaggatgatg atgatgatga tgactcctct   2520
tcagaggaga agaaacaga taacaccaaa ccaaaccgta tgcccgtagc tccatattgg   2580
acatccccag aaaagatgga aaagaaattg catgcagtgc cggctgccaa gacagtgaag   2640
ttcaaatgcc cttccagtgg gacccccaaac cccacactgc gctggttgaa aaatggcaaa   2700
gaattcaaac ctgaccacag aattggaggc tacaaggtcc gttatgccac ctggagcatc   2760
ataatggact ctgtggtgcc ctctgacaag gcaactaca cctgcattgt ggagaatgag   2820
tacggcagca tcaaccacac ataccagctg gatgtcgtgg agcggtcccc tcaccggccc   2880
atcctgcaag cagggttgcc cgccaacaaa acagtggccc tgggtagcaa cgtggagttc   2940
atgtgtaagg tgtacagtga cccgcagccg cacatccagt ggctaaagca catcgaggtg   3000
aatgggagca agattggccc agacaacctg ccttatgtcc agatcttgaa gactgctgga   3060
gttaatacca ccgacaaaga gatggaggtg cttcacttaa gaaatgtctc ctttgaggac   3120 gcagggagt atacgtgctt ggcgggtaac tctatcggac tctcccatca ctctgcatgg   3180
ttgaccgttc tggaagccct ggaagagagg ccggcagtga tgacctcgcc cctgtacctg   3240
gagatcatca tctattgcac agggcccttc ctcatctcct gcatggtggg gtcggtcatc   3300
gtctacaaga tgaagagtgg taccaagaag agtgacttcc acagccagat ggctgtgcac   3360
aagctggcca agagcatccc tctgcgcaga caggtaacag tgtctgctga ctccagtgca   3420
tccatgaact ctgggttct tctggttcgg ccatcacggc tctcctccag tgggactccc   3480
atgctagcag gggtctctga gtatgagctt cccgaagacc ctcgctggga gctgcctcgg   3540
gacagactgg tcttaggcaa accctgggga gagggctgct ttgggcaggt ggtgttggca   3600
gaggctatcg gctggacaa ggacaaaccc aaccgtgtga ccaaagtggc tgtgaagatg   3660
ttgaagtcga cgcaacaga gaaagacttg tcagacctga tctcagaaat ggagatgatg   3720
aagatgatcg ggaagcataa gaatatcatc aacctgctgg gggcctgcac gcaggatggt   3780
```

```
cccttgtatg tcatcgtgga gtatgcctcc aagggcaacc tgcgggagta cctgcaggcc    3840
cggaggcccc cagggctgga atactgctac aaccccagcc acaacccaga ggagcagctc    3900
tcctccaagg acctggtgtc ctgcgcctac caggtggccc gaggcatgga gtatctggcc    3960
tccaagaagt gcatacaccg agacctggca gccaggaatg tcctggtgac agaggacaat    4020
gtgatgaaga tagcagactt tggcctcgca cgggacattc accacatcga ctactataaa    4080
aagacaacca acgccgact gcctgtgaag tggatggcac ccgaggcatt atttgaccgg    4140
atctacaccc accagagtga tgtgtggtct ttcggggtgc tcctgtggga gatcttcact    4200
ctgggcggct cccataccc cggtgtgcct gtggaggaac ttttcaagct gctgaaggag    4260
ggtcaccgca tggacaagcc cagtaactgc accaacgagc tgtacatgat gatgcgggac    4320
tgctggcatg cagtgccctc acagagaccc accttcaagc agctggtgga agacctggac    4380
cgcatcgtgg ccttgacctc caaccaggag tacctggacc tgtccatgcc cctggaccag    4440
tactccccca gctttcccga cacccggagc tctacgtgct cctcagggga ggattccgtc    4500
ttctctcatg agccgctgcc cgaggagccc tgcctgcccc gacacccagc ccagcttgcc    4560
aatggcggac tcaaacgccg ctagaattcg aattcgctag cgaattcgaa tttaaatcgg    4620
atccgcggcc gcgaaggatc tgcgatcgct ccggtgcccg tcagtgggca gagcgcacat    4680
cgcccacagt ccccgagaag ttgggggggag ggtcggcaa ttgaacgggt gcctagagaa    4740
ggtggcgcgg ggtaaactgg gaaagtgatg tcgtgtactg gctccgcctt tttcccgagg    4800
gtgggggaga accgtatata agtgcagtag tcgccgtgaa cgttctttttt cgcaacgggt    4860 ttgccgccag aacacagctg aagcttcgag gggctcgcat ctctccttca cgcgcccgcc    4920
gccctacctg aggccgccat ccacgccggt tgagtcgcgt tctgccgcct cccgcctgtg    4980
gtgcctcctg aactgcgtcc gccgtctagg taagtttaaa gctcaggtcg agaccgggcc    5040
tttgtccggc gctcccttgg agcctaccta gactcagccg gctctccacg ctttgcctga    5100
ccctgcttgc tcaactctac gtctttgttt cgttttctgt tctgcgccgt tacagatcca    5160
agctgtgacc ggcgcctacg ctagatgacc gagtacaagc ccacggtgcg cctcgccacc    5220
cgcgacgacg tccccagggc cgtacgcacc ctcgccgccg cgttcgccga ctaccccgcc    5280
acgcgccaca ccgtcgatcc ggaccgccac atcgagcggg tcaccgagct gcaagaactc    5340
ttcctcacgc gcgtcgggct cgacatcggc aaggtgtggg tcgcggacga cggcgccgcg    5400
gtggcggtct ggaccacgcc ggagagcgtc gaagcggggg cggtgttcgc cgagatcggc    5460
ccgcgcatgg ccgagttgag cggttccgg ctggccgcg agcaacagat ggaaggcctc    5520
ctggcgccgc accggcccaa ggagcccgcg tggttcctgg ccaccgtcgg cgtctcgccc    5580
gaccaccagg gcaagggtct gggcagcgcc gtcgtgctcc ccggagtgga ggcggccgag    5640
cgcgccgggg tgcccgcctt cctggagacc tccgcgcccc gcaacctccc cttctacgag    5700
cggctcggct tcaccgtcac cgccgacgtc gaggtgcccg aaggaccgcg cacctggtgc    5760
atgacccgca agcccggtgc ctgagtcgac aatcaacctc tggattacaa aatttgtgaa    5820
agattgactg gtattcttaa ctatgttgct ccttttacgc tatgtggata cgctgcttta    5880
atgcctttgt atcatgcgtt aactaaactt gtttattgca gcttataatg gttacaaata    5940
aagcaatagc atcacaaatt tcacaaataa agcattttt tcactgcatt ctagttgtgg    6000
tttgtccaaa ctcatcaatg tatcttatca tgtctggaat tgactcaaat gatgtcaatt    6060
agtctatcag aagctcatct ggtctccctt ccgggggaca agacatccct gtttaatatt    6120
```

```
taaacagcag tgttcccaaa ctgggttctt atatcccttg ctctggtcaa ccaggttgca    6180
gggtttcctg tcctcacagg aacgaagtcc ctaaagaaac agtggcagcc aggtttagcc    6240
ccggaattga ctggattcct tttttagggc ccattggtat ggcttttcc ccgtatcccc     6300 ccaggtgtct gcaggctcaa agagcagcga aagcgttca gaggaaagcg atcccgtgcc     6360
accttccccg tgcccgggct gtccccgcac gctgccggct cggggatgcg ggggagcgc     6420 cggaccggag cggagccccg ggcggctcgc tgctgccccc tagcggggga gggacgtaat    6480
tacatccctg ggggctttgg ggggggggctg tccctgatat ctataacaag aaaatatata  6540
tataataagt tatcacgtaa gtagaacatg aaataacaat ataattatcg tatgagttaa    6600
atcttaaaag tcacgtaaaa gataatcatg cgtcattttg actcacgcgg tcgttatagt    6660
tcaaaatcag tgacacttac cgcattgaca agcacgcctc acgggagctc caagcggcga    6720
ctgagatgtc ctaaatgcac agcgacggat tcgcgctatt tagaaagaga gagcaatatt    6780
tcaagaatgc atgcgtcaat tttacgcaga ctatctttct agggttaatc tagctgcatc    6840
aggatcatat cgtcgggtct ttttccggc tcagtcatcg cccaagctgg cgctatctgg     6900
gcatcgggga ggaagaagcc cgtgcctttt cccgcgaggt tgaagcggca tggaaagagt    6960
ttgccgagga tgactgctgc tgcattgacg ttgagcgaaa acgcacgttt accatgatga    7020
ttcgggaagg tgtggccatg cacgccttta acggtgaact gttcgttcag gccacctggg    7080
ataccagttc gtcgcggctt tccggacac agttccggat ggtcagcccg aagcgcatca     7140
gcaacccgaa caataccggc gacagccgga actgccgtgc cggtgtgcag attaatgaca    7200
gcggtgcggc gctgggatat tacgtcagcg aggacgggta tcctggctgg atgccgcaga    7260
aatggacatg gataccccgt gagttacccg gcgggcgcgc ttggcgtaat catggtcata    7320
gctgtttcct gtgtgaaatt gttatccgct cacaattcca cacaacatac gagccggaag    7380
cataaagtgt aaagcctggg gtgcctaatg agtgagctaa ctcacattaa ttgcgttgcg    7440
ctcactgccc gctttccagt cgggaaacct gtcgtgccag ctgcattaat gaatcggcca    7500
acgcgcgggg agaggcggtt tgcgtattgg gcgctcttcc gcttcctcgc tcactgactc    7560
gctgcgctcg tcgttcggc tgcggcgagc ggtatcagct cactcaaagg cggtaatacg     7620
gttatccaca gaatcagggg ataacgcagg aaagaacatg tgagcaaaag gccagcaaaa    7680
ggccaggaac cgtaaaaagg ccgcgttgct ggcgtttttc cataggctcc gcccccctga    7740
cgagcatcac aaaaatcgac gctcaagtca gaggtggcga aacccgacag gactataaag    7800
ataccaggcg tttccccctg gaagctccct cgtgcgctct cctgttccga ccctgccgct    7860
taccggatac ctgtccgcct ttctcccttc gggaagcgtg gcgctttctc atagctcacg    7920
ctgtaggtat ctcagttcgg tgtaggtcgt tcgctccaag ctgggctgtg tgcacgaacc    7980
ccccgttcag cccgaccgct gcgccttatc cggtaactat cgtcttgagt ccaacccggt    8040
aagacacgac ttatcgccac tggcagcagc cactggtaac aggattagca gagcgaggta    8100
tgtaggcggt gctacagagt tcttgaagtg gtggcctaac tacggctaca ctagaaggac    8160
agtatttggt atctgcgctc tgctgaagcc agttaccttc ggaaaaagag ttggtagctc    8220
ttgatccggc aaacaaacca ccgctggtag cggtggtttt tttgtttgca agcagcagat    8280
tacgcgcaga aaaaaaggat ctcaagaaga tcctttgatc ttttctacgg ggtctgacgc    8340
tcagtggaac gaaaactcac gttaagggat tttggtcatg agattatcaa aaaggatctt    8400
cacctagatc cttttaaatt aaaaatgaag ttttaaatca atctaaagta tatatgagta    8460
aacttggtct gacagttacc aatgcttaat cagtgaggca cctatctcag cgatctgtct    8520
```

```
atttcgttca tccatagttg cctgactccc cgtcgtgtag ataactacga tacgggaggg     8580
cttaccatct ggccccagtg ctgcaatgat accgcgagac ccacgctcac cggctccaga     8640
tttatcagca ataaaccagc cagccggaag ggccgagcgc agaagtggtc ctgcaacttt     8700
atccgcctcc atccagtcta ttaattgttg ccgggaagct agagtaagta gttcgccagt     8760
taatagtttg cgcaacgttg ttgccattgc tacaggcatc gtggtgtcac gctcgtcgtt     8820
tggtatggct tcattcagct ccggttccca acgatcaagg cgagttacat gatcccccat     8880
gttgtgcaaa aaagcggtta gctccttcgg tcctccgatc gttgtcagaa gtaagttggc     8940
cgcagtgtta tcactcatgg ttatggcagc actgcataat tctcttactg tcatgccatc     9000
cgtaagatgc ttttctgtga ctggtgagta ctcaaccaag tcattctgag aatagtgtat     9060
gcggcgaccg agttgctctt gcccggcgtc aatacgggan aataccgcgc cacatagcag     9120
aactttaaaa gtgctcatca ttggaaaacg ttcttcgggg cgaaaactct caaggatctt     9180
accgctgttg agatccagtt cgatgtaacc cactcgtgca cccaactgat cttcagcatc     9240
ttttactttc accagcgttt ctgggtgagc aaaaacagga aggcaaaatg ccgcaaaaaa     9300
gggaataagg gcgacacgga aatgttgaat actcat                               9336
```

<210> SEQ ID NO 5
<211> LENGTH: 9601
<212> TYPE: DNA
<213> ORGANISM: Artificial Sequence
<220> FEATURE:
<223> OTHER INFORMATION: [pB-KLB_OPTI puro] Ligation of : piggyBac
      carrier [6450 nt] : (NheI[1714] / NheI[1714]) to PCR KLB Opti to
      pB.xdna [3143 nt] : (NheI[11] / NheI[3158]) - 9601 bp

<400> SEQUENCE: 5

```
actcttcctt tttcaatatt attgaagcat ttatcagggt tattgtctca tgagcggata       60
catatttgaa tgtatttaga aaaataaaca ataggggtt ccgcgcacat ttccccgaaa      120
agtgccacct aaattgtaag cgttaatatt ttgttaaaat tcgcgttaaa ttttgttaa      180 atcagctcat tttttaacca ataggccgaa atcggcaaaa tcccttataa atcaaaagaa      240
tagaccgaga tagggttgag tgttgttcca gtttggaaca agagtccact attaaagaac      300
gtggactcca acgtcaaagg gcgaaaaacc gtctatcagg gcgatggccc actacgtgaa      360
ccatcaccct aatcaagttt tttggggtcg aggtgccgta agcactaaa tcggaaccct      420 aaagggagcc cccgatttag agcttgacgg ggaaagccgg cgaacgtggc gagaaaggaa      480
gggaagaaag cgaaaggagc gggcgctagg gcgctggcaa gtgtagcggt cacgctgcgc      540
gtaaccacca cacccgccgc gcttaatgcg ccgctacagg gcgcgtccca ttcgccattc      600
aggctgcgca actgttggga agggcgatcg gtgcgggcct cttcgctatt acgccagctg      660
gcgaaagggg gatgtgctgc aaggcgatta agttgggtaa cgccagggtt ttcccagtca      720
cgacgttgta aaacgacggc cagtgagcgc gcctcgttca ttcacgtttt tgaacccgtg      780
gaggacgggc agactcgcgg tgcaaatgtg ttttacagcg tgatggagca gatgaagatg      840
ctcgacacgc tgcagaacac gcagctagat taacccctaga aagataatca tattgtgacg      900
tacgttaaag ataatcatgt gtaaaattga cgcatgtgtt ttatcggtct gtatatcgag      960
gtttatttat taatttgaat agatattaag ttttattata tttacactta catactaata     1020
ataaattcaa caaacaattt atttatgttt atttatttat taaaaaaaac aaaaactcaa     1080
aatttcttct ataaagtaac aaaacttttta tgagggacag ccccccccca aagcccccag     1140
```

```
ggatgtaatt acgtccctcc cccgctaggg ggcagcagcg agccgcccgg ggctccgctc    1200
cggtccggcg ctccccccgc atccccgagc cggcagcgtg cggggacagc ccgggcacgg    1260
ggaaggtggc acgggatcgc tttcctctga acgcttctcg ctgctctttg agcctgcaga    1320
cacctggggg gatacgggga aaaggcctcc acggccacta gtattatgcc cagtacatga    1380
ccttatggga ctttcctact tggcagtaca tctacgtatt agtcatcgct attaccatgg    1440
tgatgcggtt ttggcagtac atcaatgggc gtggatagcg gtttgactca cggggatttc    1500
caagtctcca ccccattgac gtcaatggga gtttgttttg gcaccaaaat caacgggact    1560
ttccaaaatg tcgtaacaac tccgccccat tgacgcaaat gggcggtagg cgtgtacggt    1620
gggaggttta tataagcaga gctcgtttag tgaaccgtca gatcgcctgg agacgccatc    1680
cacgctgttt tgacctccat agaagattct agagctagcg ccaccatgaa gcctggatgt    1740
gccgccggaa gccccggcaa cgagtggatc ttcttcagca ccgacgagat caccacccgg    1800
tacagaaaca ccatgagcaa cggcggcctg cagcggagcg tgatcctgtc tgctctgatc    1860
ctgctgagag ccgtgaccgg ctttagcggc gacggcagac ccatctggtc caagaacccc    1920
aacttcaccc ccgtgaacga gagccagctg ttcctgtacg ataccttccc caagaacttc    1980
ttctggggca tcggcacagg cgccctgcag gtggaaggca gctggaagaa ggatggcaag    2040
ggccccagca tctgggacca cttcatccac acccacctga gaacgtgtc cagcaccaac    2100 ggcagcagcg acagctacat cttcctggaa aaggacctga cgccctgga cttcatcggc    2160 gtgtccttct accagttcag catcagctgg cccagactgt tccccgacgg catcgtgaca    2220
gtggccaatg ccaagggcct gcagtactac agcaccctgc tggacgccct ggtgctgaga    2280
aacatcgagc ccatcgtgac cctgtaccac tgggacctgc cactggctct gcaggagaaa    2340
tacgcgggct ggaaaaacga caccatcatc gacatcttca cgactacgc cacctactgc    2400 ttccagatgt tcggcgacag agtgaagtac tggatcacca tccacaaccc ctacctggtg    2460
gcctggcacg gctatggcac cggaatgcat gcccctggcg agaagggaaa tctggccgcc    2520
gtgtacaccg tgggccacaa cctgatcaag gcccacagca agtgtggca caactacaac    2580 acccacttcc ggccccacca gaagggctgg ctgtctatca cactgggcag ccactggatc    2640
gagcctaacc gcagcgagaa caccatggat atcttcaagt gccagcagag catggtgtcc    2700
gtgctgggat ggttcgccaa ccccattcat ggcgacggcg actacccga gggcatgcgg    2760 aagaaactgt tcagcgtgct gcccatcttc agcgaggccg agaagcacga gatgcggggc    2820
accgccgatt tcttcgcctt tagcttcggc cccaacaact tcaagcccct gaataccatg    2880
gccaagatgg ccagaatgt gtccctgaac ctgagagagg ccctgaactg gatcaagctg    2940
gagtacaaca ccccccggat cctgatcgcc gagaacggct ggttcaccga cagcagagtg    3000
aaaaccgagg acaccaccgc catctatatg atgaagaact tcctgagcca ggtgctgcag    3060
gctatccggc tggatgagat ccgggtgttc ggctacacag cctggtcact gctggatggc    3120
ttcgagtggc aggacgccta caccatcaga cggggcctgt tctacgtgga cttcaacagc    3180
aagcagaaag agcggaagcc caagagcagc gcccactact acaagcagat catcagagag    3240
aatggcttca gcctgaaaga aagcacccc gacgtgcagg ccagttccc ctgtgatttt    3300 tcctggggcg tgaccgagag cgtgctgaag cctgagtctg tggcctccag cccccagttt    3360 agcgacccc acctgtacgt gtggaacgcc accggcaacc ggctgctgca tagagtggaa    3420
ggcgtgcggc tgaaaaccag acccgcccag tgcaccgact cgtgaacat caagaaacag    3480 ctggaaatgc tggcccggat gaaagtgacc cactacagat tcgccctgga ttgggcctcc    3540
```

```
gtgctgccta ccggaaacct gtctgccgtg aacagacagg ccctgaggta ctacagatgc    3600
gtggtgtccg agggcctgaa gctgggcatc agcgccatgg tcacactgta ctaccccacc    3660
cacgcccacc tgggactgcc tgaacctctg ctgcatgccg acggctggct gaatccttct    3720
acagccgagg ccttccaggc ctacgccgga ctgtgctttc aggaactggg cgacctcgtg    3780
aagctgtgga tcacaatcaa cgagcccaac agactgagcg acatctacaa cagaagcggc    3840
aacgacacct acgcgctgc ccacaatctg ctggtggctc atgccctggc ctggcggctg    3900
tacgacagac agttcagacc aagccagcgg ggagccgtgt ctctgtctct gcatgctgat    3960
tgggccgagc ccgccaaccc ttacgccgac tctcattgga gagccgccga gcggttcctg    4020
cagttcgaga tcgcttggtt tgccgagccc ctgttcaaga ccggcgatta ccctgccgcc    4080
atgagagagt atatcgccag caagcacaga agaggcctga gcagctccgc cctgcctaga    4140
ctgacagagg ccgaaaggcg gctgctgaag ggcaccgtgg atttctgtgc cctgaatcac    4200
ttcaccacca gattcgtgat gcacgagcag ctggccggca gcagatacga cagcgaccgg    4260
gacatccagt ttctgcagga catcacccgg ctgagcagcc ctacaagact ggccgtgatc    4320
ccttggggcg tgcggaagct gctgagatgg gtgcgcagaa actacggcga catggacatc    4380
tatatcaccg ccagcggcat cgacgaccag gccctggaag atgaccggct gcggaagtac    4440
tacctgggca gtacctgca ggaagtgctg aaggcctacc tgatcgacaa agtgcggatc    4500
aagggctact acgccttcaa gctggccgag gaaaagagca agcccagatt cggcttcttc    4560
accagcgact tcaaggccaa gtccagcatc cagttctaca acaaagtgat cagcagcagg    4620
ggcttcccat tcgagaacag cagcagcaga tgcagccaga cacaggaaaa caccgagtgt    4680
accgtgtgcc tgttcctggt gcagaagaag cctctgatct ttctgggctg ctgcttcttt    4740
agcacactgg tgctgctgct gagcattgcc atctttcagc ggcagaagcg gagaaagttt    4800
tggaaggcca agaatctgca gcacatcccc ctgaaaaagg gcaagcgggt ggtgtcttga    4860
gctagcgaat tcgaattaa atcggatccg cggccgcgaa ggatctgcga tcgctccggt    4920
gcccgtcagt gggcagagcg cacatcgccc acagtccccg agaagttggg ggagggtc    4980 ggcaattgaa cgggtgccta gagaaggtgg cgcggggtaa actgggaaag tgatgtcgtg    5040
tactggctcc gccttttcc cgagggtggg ggagaaccgt atataagtgc agtagtcgcc    5100
gtgaacgttc ttttttcgcaa cgggtttgcc gccagaacac agctgaagct cgagggggct    5160
cgcatctctc cttcacgcgc ccgccgccct acctgaggcc gccatccacg ccggttgagt    5220
cgcgttctgc cgcctcccgc ctgtggtgcc tcctgaactg cgtccgccgt ctaggtaagt    5280
ttaaagctca ggtcgagacc gggcctttgt ccggcgctcc cttggagcct acctagactc    5340
agccggctct ccacgctttg cctgaccctg cttgctcaac tctacgtctt tgtttcgttt    5400
tctgttctgc gccgttacag atccaagctg tgaccggcgc ctacgctaga tgaccgagta    5460
caagcccacg gtgcgcctcg ccacccgcga cgacgtcccc agggccgtac gcaccctcgc    5520
cgccgcgttc gccgactacc ccgccacgcg ccacaccgtc gatccggacc gccacatcga    5580
gcgggtcacc gagctgcaag aactcttcct cacgcgcgtc gggctcgaca tcggcaaggt    5640
gtgggtcgcg gacgacggcg ccgcggtggc ggtctggacc acgccggaga gcgtcgaagc    5700
gggggcggtg ttcgccgaga tcggcccgcg catggccgag ttgagcggtt cccggctggc    5760
cgcgcagcaa cagatggaag gcctcctggc gccgcaccgg cccaaggagc ccgcgtggtt    5820
cctggccacc gtcggcgtct cgcccgacca ccagggcaag ggtctgggca gcgccgtcgt    5880
```

```
gctccccgga gtggaggcgg ccgagcgcgc cggggtgccc gccttcctgg agacctccgc   5940
gccccgcaac ctcccttct acgagcggct cggcttcacc gtcaccgccg acgtcgaggt    6000
gcccgaagga ccgcgcacct ggtgcatgac ccgcaagccc ggtgcctgag tcgacaatca   6060
acctctggat tacaaaattt gtgaaagatt gactggtatt cttaactatg ttgctccttt   6120
tacgctatgt ggatacgctg ctttaatgcc tttgtatcat gcgttaacta aacttgttta   6180
ttgcagctta taatggttac aaataaagca atagcatcac aaatttcaca ataaagcat    6240 tttttcact gcattctagt tgtggtttgt ccaaactcat caatgtatct tatcatgtct    6300
ggaattgact caaatgatgt caattagtct atcagaagct catctggtct cccttccggg   6360
ggacaagaca tccctgttta atatttaaac agcagtgttc ccaaactggg ttcttatatc   6420
ccttgctctg gtcaaccagg ttgcaggtt cctgtcctc acaggaacga agtccctaaa     6480
gaaacagtgg cagccaggtt tagccccgga attgactgga ttcctttttt agggcccatt   6540
ggtatggctt ttccccgta tcccccagg tgtctgcagg ctcaaagagc agcgagaagc     6600
gttcagagga aagcgatccc gtgccacctt ccccgtgccc gggctgtccc cgcacgctgc   6660
cggctcgggg atgcgggggg agcgccggac cggagcggag ccccgggcgg ctcgctgctg   6720 cccctagcg gggagggac gtaattacat ccctggggc tttgggggg ggctgtccct       6780 gatatctata acaagaaaat atatatataa taagttatca cgtaagtaga acatgaaata   6840
acaatataat tatcgtatga gttaaatctt aaaagtcacg taaagataa tcatgcgtca    6900 ttttgactca cgcggtcgtt atagttcaaa atcagtgaca cttaccgcat tgacaagcac   6960
gcctcacggg agctccaagc ggcgactgag atgtcctaaa tgcacagcga cggattcgcg   7020
ctatttagaa agagagagca atatttcaag aatgcatgcg tcaatttac gcagactatc    7080 tttctagggt taatctagct gcatcaggat catatcgtcg ggtcttttt ccggctcagt    7140 catcgcccaa gctggcgcta tctgggcatc ggggaggaag aagcccgtgc cttttcccgc   7200
gaggttgaag cggcatggaa agagtttgcc gaggatgact gctgctgcat tgacgttgag   7260
cgaaaacgca cgtttaccat gatgattcgg gaaggtgtgg ccatgcacgc ctttaacggt   7320
gaactgttcg ttcaggccac ctgggatacc agttcgtcgc ggcttttccg gacacagttc   7380
cggatggtca gcccgaagcg catcagcaac ccgaacaata ccggcgacag ccggaactgc   7440
cgtgccggtg tgcagattaa tgacagcggt gcggcgctgg gatattacgt cagcgaggac   7500
gggtatcctg gctggatgcc gcagaaatgg acatggatac ccgtgagtt acccggcggg   7560 cgcgcttggc gtaatcatgg tcatagctgt ttcctgtgtg aaattgttat ccgctcacaa   7620
ttccacacaa catacgagcc ggaagcataa agtgtaaagc ctggggtgcc taatgagtga   7680
gctaactcac attaattgcg ttgcgctcac tgcccgcttt ccagtcggga aacctgtcgt   7740
gccagctgca ttaatgaatc ggccaacgcg cggggagagg cggtttgcgt attgggcgct   7800
cttccgcttc ctcgctcact gactcgctgc gctcggtcgt tcggctgcgg cgagcggtat   7860
cagctcactc aaaggcggta atacggttat ccacagaatc aggggataac gcaggaaaga   7920
acatgtgagc aaaaggccag caaaaggcca ggaaccgtaa aaaggccgcg ttgctggcgt   7980
ttttccatag gctccgcccc cctgacgagc atcacaaaaa tcgacgctca agtcagaggt   8040
ggcgaaaccc gacaggacta taaagatacc aggcgtttcc ccctggaagc tccctcgtgc   8100
gctctcctgt tccgaccctg ccgcttaccg gatacctgtc cgcctttctc ccttcgggaa   8160
gcgtggcgct ttctcatagc tcacgctgta ggtatctcag ttcggtgtag gtcgttcgct   8220
ccaagctggg ctgtgtgcac gaaccccccg ttcagcccga ccgctgcgcc ttatccggta   8280
```

```
actatcgtct tgagtccaac ccggtaagac acgacttatc gccactggca gcagccactg    8340
gtaacaggat tagcagagcg aggtatgtag gcggtgctac agagttcttg aagtggtggc    8400
ctaactacgg ctacactaga aggacagtat ttggtatctg cgctctgctg aagccagtta    8460
ccttcggaaa aagagttggt agctcttgat ccggcaaaca aaccaccgct ggtagcggtg    8520 gttttttttgt ttgcaagcag cagattacgc gcagaaaaaa aggatctcaa gaagatcctt    8580
tgatcttttc tacggggtct gacgctcagt ggaacgaaaa ctcacgttaa gggattttgg    8640
tcatgagatt atcaaaaagg atcttcacct agatcctttt aaattaaaaa tgaagtttta    8700
aatcaatcta agtatatat gagtaaactt ggtctgacag ttaccaatgc ttaatcagtg    8760
aggcacctat ctcagcgatc tgtctatttc gttcatccat agttgcctga ctccccgtcg    8820
tgtagataac tacgatacgg gagggcttac catctggccc cagtgctgca atgataccgc    8880
gagacccacg ctcaccggct ccagatttat cagcaataaa ccagccagcc ggaagggccg    8940
agcgcagaag tggtcctgca actttatccg cctccatcca gtctattaat tgttgccggg    9000
aagctagagt aagtagttcg ccagttaata gtttgcgcaa cgttgttgcc attgctacag    9060
gcatcgtggt gtcacgctcg tcgtttggta tggcttcatt cagctccggt tcccaacgat    9120
caaggcgagt tacatgatcc cccatgttgt gcaaaaaagc ggttagctcc ttcggtcctc    9180
cgatcgttgt cagaagtaag ttggccgcag tgttatcact catggttatg gcagcactgc    9240
ataattctct tactgtcatg ccatccgtaa gatgcttttc tgtgactggt gagtactcaa    9300
ccaagtcatt ctgagaatag tgtatgcggc gaccgagttg ctcttgcccg gcgtcaatac    9360
gggataatac cgcgccacat agcagaactt taaaagtgct catcattgga aaacgttctt    9420
cggggcgaaa actctcaagg atcttaccgc tgttgagatc cagttcgatg taacccactc    9480
gtgcacccaa ctgatcttca gcatctttta ctttcaccag cgtttctggg tgagcaaaaa    9540
caggaaggca aaatgccgca aaaaagggaa taagggcgac acggaaatgt tgaatactca    9600
t                                                                    9601
```

<210> SEQ ID NO 6
<211> LENGTH: 8582
<212> TYPE: DNA
<213> ORGANISM: Artificial Sequence
<220> FEATURE:
<223> OTHER INFORMATION: [pB-UAS-Luc hygro] Ligation of : piggyBac
      carrier [4905 nt] : (AccI[2903] / SpeI[1357]) to PCR UAS-Luc hygro
      to pB.xdna [3671 nt] : (SpeI[12] / AccI[3686]) - 8582 bp

<400> SEQUENCE: 6

```
actcttcctt tttcaatatt attgaagcat ttatcagggt tattgtctca tgagcggata     60
catatttgaa tgtatttaga aaaataaaca aataggggtt ccgcgcacat ttccccgaaa    120
agtgccacct aaattgtaag cgttaatatt ttgttaaaat tcgcgttaaa ttttgttaa    180 atcagctcat tttttaacca ataggccgaa atcggcaaaa tcccttataa atcaaaagaa    240
tagaccgaga tagggttgag tgttgttcca gtttggaaca agagtccact attaaagaac    300
gtggactcca acgtcaaagg gcgaaaaacc gtctatcagg gcgatggccc actacgtgaa    360
ccatcaccct aatcaagttt ttggggtcg aggtgccgta aagcactaaa tcggaaccct    420
aaagggagcc cccgatttag agcttgacgg ggaaagccgg cgaacgtggc gagaaaggaa    480
gggaagaaag cgaaaggagc gggcgctagg gcgctggcaa gtgtagcggt cacgctgcgc    540
gtaaccacca cacccgccgc gcttaatgcg ccgctacagg gcgcgtccca ttcgccattc    600
```

```
aggctgcgca actgttggga agggcgatcg gtgcgggcct cttcgctatt acgccagctg     660
gcgaaagggg gatgtgctgc aaggcgatta agttgggtaa cgccagggtt ttcccagtca     720
cgacgttgta aaacgacggc cagtgagcgc gcctcgttca ttcacgtttt tgaacccgtg     780
gaggacgggc agactcgcgg tgcaaatgtg ttttacagcg tgatggagca gatgaagatg     840
ctcgacacgc tgcagaacac gcagctagat taaccctaga aagataatca tattgtgacg     900
tacgttaaag ataatcatgt gtaaaattga cgcatgtgtt ttatcggtct gtatatcgag     960
gtttatttat taatttgaat agatattaag ttttattata tttacactta catactaata    1020
ataaattcaa caaacaattt atttatgttt atttatttat taaaaaaaac aaaaactcaa    1080
aatttcttct ataaagtaac aaaacttttta tgagggacag ccccccccca aagcccccag    1140
ggatgtaatt acgtccctcc cccgctaggg ggcagcagcg agccgcccgg ggctccgctc    1200
cggtccggcg ctcccccgc atccccgagc cggcagcgtg cggggacagc ccgggcacgg    1260
ggaaggtggc acgggatcgc tttcctctga acgcttctcg ctgctctttg agcctgcaga    1320
cacctggggg gatacgggga aaaggcctcc acggccacta gtggcctaac tggccggtac    1380
ccggaggact gtcctccgag tccggaggac tgtcctccga gtccgagga ctgtcctccg    1440 agtccggagg actgtcctcc gagtccggag gactgtcctc cgctcgagga tatcaagatc    1500
tggcctcggc ggccaagctt agacactaga gggtatataa tggaagctcg acttccagct    1560
tggcaatccg gtactgttgg taaagccacc atggaagatg ccaaaaacat taagaagggc    1620
ccagcgccat tctacccact cgaagacggg accgccggcg agcagctgca caaagccatg    1680
aagcgctacg ccctggtgcc cggcaccatc gcctttaccg acgcacatat cgaggtggac    1740
attacctacg ccgagtactt cgagatgagc gttcggctgg cagaagctat gaagcgctat    1800
gggctgaata caaaccatcg gatcgtggtg tgcagcgaga atagcttgca gttcttcatg    1860
cccgtgttgg gtgccctgtt catcggtgtg gctgtggccc cagctaacga catctacaac    1920
gagcgcgagc tgctgaacag catgggcatc agccagccca ccgtcgtatt cgtgagcaag    1980
aaagggctgc aaaagatcct caacgtgcaa agaagctac cgatcataca aagatcatc    2040 atcatggata gcaagaccga ctaccagggc ttccaaagca tgtacacctt cgtgacttcc    2100
catttgccac ccggcttcaa cgagtacgac ttcgtgcccg agagcttcga ccgggacaaa    2160
accatcgccc tgatcatgaa cagtagtggc agtaccggat tgcccaaggg cgtagcccta    2220
ccgcaccgca ccgcttgtgt ccgattcagt catgcccgcg accccatctt cggcaaccag    2280
atcatccccg acaccgctat cctcagcgtg gtgccatttc accacggctt cggcatgttc    2340
accacgctgg gctacttgat ctgcggcttt cgggtcgtgc tcatgtaccg cttcgaggag    2400
gagctattct tgcgcagctt gcaagactat aagattcaat ctgccctgct ggtgcccaca    2460
ctatttagct tcttcgctaa gagcactctc atcgacaagt acgacctaag caacttgcac    2520
gagatcgcca gcggcggggc gccgctcagc aaggaggtag gtgaggccgt ggccaaacgc    2580
ttccacctac caggcatccg ccagggctac ggcctgacag aaacaaccag cgccattctg    2640
atcacccccg aagggacga caagcctggc gcagtaggca aggtggtgcc cttcttcgag    2700
gctaaggtgg tggacttgga caccggtaag acactgggtg tgaaccagcg cggcgagctg    2760
tgcgtccgtg gccccatgat catgagcggc tacgttaaca ccccgaggc tacaaacgct    2820 ctcatcgaca aggacggctg gctgcacagc ggcgacatcg cctactggga cgaggacgag    2880
cacttcttca tcgtgaccgg ctgaagagc ctgatcaaat acaagggcta ccaggtagcc    2940
ccagccgaac tggagagcat cctgctgcaa caccccaaca tcttcgacgc cggggtcgcc    3000
```

| | |
|---|---|
| ggcctgcccg acgacgatgc cggcgagctg cccgccgcag tcgtcgtgct ggaacacggt | 3060 |
| aaaaccatga ccgagaagga gatcgtggac tatgtggcca gccaggttac aaccgccaag | 3120 |
| aagctgcgcg gtggtgttgt gttcgtggac gaggtgccta aaggactgac cggcaagttg | 3180 |
| gacgcccgca agatccgcga gattctcatt aaggccaaga agggcggcaa gatcgccgtg | 3240 |
| taataattct agagtcgggg cggccggccg cttcgagcag acatgataag atacattgat | 3300 |
| gagtttggac aaaccacaac tagaatgcag tgaaaaaaat gctttatttg tgaaatttgt | 3360 |
| gatgctattg ctttatttgt aaccattata agctgcaata aacaagttaa caacaacaat | 3420 |
| tgcattcatt ttatgtttca ggttcagggg gaggtgtggg aggtttttta aagcaagtaa | 3480 |
| aacctctaca aatgtggtaa aatcgataag gatccgtttg cgtattgggc gctcttccgc | 3540 |
| tgatctgcgc agcaccatgg cctgaaataa cctctgaaag aggaacttgg ttagctacct | 3600 |
| tctgaggcgg aaagaaccag ctgtggaatg tgtgtcagtt agggtgtgga aagtccccag | 3660 |
| gctccccagc aggcagaagt atgcaaagca tgcatctcaa ttagtcagca accaggtgtg | 3720 |
| gaaagtcccc aggctcccca gcaggcagaa gtatgcaaag catgcatctc aattagtcag | 3780 |
| caaccatagt cccgccccta actccgccca tcccgcccct aactccgccc agttccgccc | 3840 |
| attctccgcc ccatggctga ctaatttttt ttatttatgc agaggccgag gccgcctctg | 3900 |
| cctctgagct attccagaag tagtgaggag gcttttttgg aggcctaggc ttttgcaaaa | 3960 |
| agctcgattc ttctgacact agcgccacca tgaagaagcc cgaactcacc gctaccagcg | 4020 |
| ttgaaaaatt tctcatcgag aagttcgaca gtgtgagcga cctgatgcag ttgtcggagg | 4080 |
| gcgaagagag ccgagccttc agcttcgatg tcggcggacg cggctatgta ctgcgggtga | 4140 |
| atagctgcgc tgatggcttc tacaaagacc gctacgtgta ccgccacttc gccagcgctg | 4200 |
| cactacccat ccccgaagtg ttggacatcg gcagttcag cgagagcctg acatactgca | 4260 |
| tcagtagacg cgcccaaggc gttactctcc aagacctccc cgaaacagag ctgcctgctg | 4320 |
| tgttacagcc tgtcgccgaa gctatggatg ctattgccgc cgccgacctc agtcaaacca | 4380 |
| gcggcttcgg cccattcggg ccccaaggca tcggccagta cacaacctgg cgggatttca | 4440 |
| tttgcgccat tgctgatccc catgtctacc actggcagac cgtgatggac gacaccgtgt | 4500 |
| ccgccagcgt agctcaagcc ctggacgaac tgatgctgtg ggccgaagac tgtcccgagg | 4560 |
| tgcgccacct cgtccatgcc gacttcggca gcaacaacgt cctgaccgac aacgccgca | 4620 |
| tcaccgccgt aatcgactgg tccgaagcta tgttcgggga cagtcagtac gaggtggcca | 4680 |
| acatcttctt ctggcggccc tggctggctt gcatggagca gcagactcgc tacttcgagc | 4740 |
| gccggcatcc cgagctggcc ggcagccctc gtctgcgagc ctacatgctg cgcatcggcc | 4800 |
| tggatcagct ctaccagagc ctcgtggacg gcaacttcga cgatgctgcc tgggctcaag | 4860 |
| gccgctgcga tgccatcgtc cgcagcgggg ccggcaccgt cggtcgcaca caaatcgctc | 4920 |
| gccggagcgc agccgtatgg accgacggct gcgtcgaggt gctggccgac agcggcaacc | 4980 |
| gccggcccag tacacgaccg cgcgctaagg aggtaggtcg agtttaaact gtcgacaatc | 5040 |
| aacctctgga ttacaaaatt tgtgaaagat tgactggtat tcttaactat gttgctcctt | 5100 |
| ttacgctatg tggatacgct gctttaatgc ctttgtatca tgcgttaact aaacttgttt | 5160 |
| attgcagctt ataatggtta caaataaagc aatagcatca caaatttcac aaataaagca | 5220 |
| ttttttcac tgcattctag ttgtggtttg tccaaactca tcaatgtatc ttatcatgtc | 5280 |
| tggaattgac tcaaatgatg tcaattagtc tatcagaagc tcatctggtc tcccttccgg | 5340 |

```
gggacaagac atccctgttt aatatttaaa cagcagtgtt cccaaactgg gttcttatat    5400
cccttgctct ggtcaaccag gttgcagggt ttcctgtcct cacaggaacg aagtccctaa    5460
agaaacagtg gcagccaggt ttagccccgg aattgactgg attccttttt tagggcccat    5520
tggtatggct ttttccccgt atcccccag gtgtctgcag gctcaaagag cagcgagaag     5580
cgttcagagg aaagcgatcc cgtgccacct tccccgtgcc cgggctgtcc ccgcacgctg    5640
ccggctcggg gatgcggggg gagcgccgga ccggagcgga gccccgggcg gctcgctgct    5700
gcccccctagc gggggaggga cgtaattaca tccctggggg ctttgggggg gggctgtccc   5760
tgatatctat aacaagaaaa tatatatata ataagttatc acgtaagtag aacatgaaat    5820
aacaatataa ttatcgtatg agttaaatct aaaagtcac gtaaaagata atcatgcgtc     5880
attttgactc acgcggtcgt tatagttcaa aatcagtgac acttaccgca ttgacaagca    5940
cgcctcacgg gagctccaag cggcgactga gatgtcctaa atgcacagcg acggattcgc    6000
gctatttaga aagagagagc aatatttcaa gaatgcatgc gtcaatttta cgcagactat    6060
ctttctaggg ttaatctagc tgcatcagga tcatatcgtc gggtcttttt tccggctcag    6120
tcatcgccca agctggcgct atctgggcat cggggaggaa gaagcccgtg cctttttcccg   6180
cgaggttgaa gcggcatgga aagagtttgc cgaggatgac tgctgctgca ttgacgttga    6240
gcgaaaacgc acgttaccca tgatgattcg ggaaggtgtg gccatgcacg cctttaacgg    6300
tgaactgttc gttcaggcca cctgggatac cagttcgtcg cggcttttcc ggacacagtt    6360
ccggatggtc agcccgaagc gcatcagcaa cccgaacaat accggcgaca gccggaactg    6420
ccgtgccggt gtgcagatta atgacagcgg tgcggcgctg ggatattacg tcagcgagga    6480
cgggtatcct ggctggatgc cgcagaaatg gacatggata ccccgtgagt tacccggcgg    6540
gcgcgcttgg cgtaatcatg gtcatagctg tttcctgtgt gaaattgtta tccgctcaca    6600
attccacaca acatacgagc cggaagcata aagtgtaaag cctggggtgc ctaatgagtg    6660
agctaactca cattaattgc gttgcgctca ctgcccgctt tccagtcggg aaacctgtcg    6720
tgccagctgc attaatgaat cggccaacgc gcggggagag gcggtttgcg tattgggcgc    6780
tcttccgctt cctcgctcac tgactcgctg cgctcggtcg ttcggctgcg gcgagcggta    6840
tcagctcact caaaggcggt aatacggtta tccacagaat caggggataa cgcaggaaag    6900
aacatgtgag caaaaggcca gcaaaaggcc aggaaccgta aaaaggccgc gttgctggcg    6960
ttttttccata ggctccgccc ccctgacgag catcacaaaa atcgacgctc aagtcagagg    7020
tggcgaaacc cgacaggact ataaagatac caggcgtttc cccctggaag ctccctcgtg    7080
cgctctcctg ttccgaccct gccgcttacc ggatacctgt ccgcctttct cccttcggga    7140
agcgtggcgc tttctcatag ctcacgctgt aggtatctca gttcggtgta ggtcgttcgc    7200
tccaagctgg gctgtgtgca cgaaccccc gttcagcccg accgctgcgc cttatccggt      7260
aactatcgtc ttgagtccaa cccggtaaga cacgacttat cgccactggc agcagccact    7320
ggtaacagga ttagcagagc gaggtatgta ggcggtgcta cagagttctt gaagtggtgg    7380
cctaactacg gctacactag aaggacagta tttggtatct gcgctctgct gaagccagtt    7440
accttcggaa aaagagttgg tagctcttga tccggcaaac aaaccaccgc tggtagcggt    7500
ggtttttttg tttgcaagca gcagattacg cgcagaaaaa aaggatctca agaagatcct    7560
ttgatctttt ctacggggtc tgacgctcag tggaacgaaa actcacgtta agggattttg    7620
gtcatgagat tatcaaaaag gatcttcacc tagatccttt taaattaaaa atgaagtttt    7680
aaatcaatct aaagtatata tgagtaaact tggtctgaca gttaccaatg cttaatcagt    7740
```

```
gaggcaccta tctcagcgat ctgtctattt cgttcatcca tagttgcctg actcccgtc    7800 gtgtagataa ctacgatacg ggagggctta ccatctggcc ccagtgctgc aatgataccg    7860
cgagacccac gctcaccggc tccagattta tcagcaataa accagccagc cggaagggcc    7920
gagcgcagaa gtggtcctgc aactttatcc gcctccatcc agtctattaa ttgttgccgg    7980
gaagctagag taagtagttc gccagttaat agtttgcgca acgttgttgc cattgctaca    8040
ggcatcgtgg tgtcacgctc gtcgtttggt atggcttcat tcagctccgg ttcccaacga    8100
tcaaggcgag ttacatgatc ccccatgttg tgcaaaaaag cggttagctc cttcggtcct    8160
ccgatcgttg tcagaagtaa gttggccgca gtgttatcac tcatggttat ggcagcactg    8220
cataattctc ttactgtcat gccatccgta agatgctttt ctgtgactgg tgagtactca    8280
accaagtcat tctgagaata gtgtatgcgg cgaccgagtt gctcttgccc ggcgtcaata    8340
cgggataata ccgcgccaca tagcagaact ttaaaagtgc tcatcattgg aaaacgttct    8400
tcggggcgaa aactctcaag gatcttaccg ctgttgagat ccagttcgat gtaacccact    8460
cgtgcaccca actgatcttc agcatctttt actttcacca gcgtttctgg gtgagcaaaa    8520
acaggaaggc aaaatgccgc aaaaaaggga ataagggcga cacggaaatg ttgaatactc    8580
at                                                                  8582

<210> SEQ ID NO 7
<211> LENGTH: 5459
<212> TYPE: DNA
<213> ORGANISM: Artificial Sequence
<220> FEATURE:
<223> OTHER INFORMATION: [pRL-TK(neo)] Ligation of : pRL-TK [4088 nt] :
      (BamHI[2270] / BamHI[2270]) to PCR(MSCVneo) [1363 nt] :
      (BamHI[11] / BamHI[1378])- 5459 bp

<400> SEQUENCE: 7
tctcctaatt ccttaattta atacttattc tgataatgat aactaaaaga tctaaatgag      60
tcttcggacc tcgcgggggc cgcttaagcg gtggttaggg tttgtctgac gcgggggggag    120 ggggaaggaa cgaaacactc tcattcggag gcggctcggg gtttggtctt ggtggccacg    180
ggcacgcaga agagcgccgc gatcctctta agcaccccc cgccctccgt ggaggcgggg    240
gtttggtcgg cggtgtggtaa ctggcgggcc gctgactcgg gcgggtcgcg cgccccagag    300
tgtgaccttt tcggtctgct cgcagacccc cgggcggcgc cgccgcggcg cgacgggct     360 cgctgggtcc taggctccat ggggaccgta tacgtggaca ggctctggag catccgcacg    420
actgcggtga tattaccgga gaccttctgc gggacgagcc gggtcacgcg gctgacgcgg    480
agcgtccgtt gggcgacaaa caccaggacg gggcacaggt acactatctt gtcacccgga    540
ggcgcgaggg actgcaggag cttcaggagt ggcgcagct gcttcatccc cgtggccgt     600 tgctcgcgtt tgctggcggt gtccccggaa gaaatatatt tgcatgtctt tagttctatg    660
atgacacaaa ccccgcccag cgtcttgtca ttggcgaatt cgaacacgca gatgcagtcg    720
gggcggcgcg gtcccaggtc cacttcgcat attaaggtga cgcgtgtggc ctcgaacacc    780
gagcgaccct gcagcgaccc gcttaaaagc ttgattcttc tgacacaaca gtctcgaact    840
taagctgcag aagttggtcg tgaggcactg ggcaggtaag tatcaaggtt acaagacagg    900
tttaaggaga ccaatagaaa ctgggcttgt cgagacagag aagactcttg cgtttctgat    960
aggcacctat tggtcttact gacatccact ttgcctttct ctccacaggt gtccactccc   1020
agttcaatta cagctcttaa ggctagagta cttaatacga ctcactatag gctagccacc   1080
```

```
atgacttcga aagtttatga tccagaacaa aggaaacgga tgataactgg tccgcagtgg      1140
tgggccagat gtaaacaaat gaatgttctt gattcattta ttaattatta tgattcagaa      1200
aaacatgcag aaaatgctgt tatttttta catggtaacg cggcctcttc ttatttatgg       1260
cgacatgttg tgccacatat tgagccagta gcgcggtgta ttataccaga ccttattggt      1320
atgggcaaat caggcaaatc tggtaatggt tcttataggt tacttgatca ttacaaatat      1380
cttactgcat ggtttgaact tcttaattta ccaaagaaga tcattttgt cggccatgat       1440 tggggtgctt gtttggcatt tcattatagc tatgagcatc aagataagat caaagcaata      1500
gttcacgctg aaagtgtagt agatgtgatt gaatcatggg atgaatgcc tgatattgaa       1560 gaagatattg cgttgatcaa atctgaagaa ggagaaaaaa tggttttgga gaataacttc      1620
ttcgtggaaa ccatgttgcc atcaaaaatc atgagaaagt tagaaccaga gaatttgca      1680 gcatatcttg aaccattcaa agagaaaggt gaagttcgtc gtccaacatt atcatggcct      1740
cgtgaaatcc cgttagtaaa aggtggtaaa cctgacgttg tacaaattgt taggaattat      1800
aatgcttatc tacgtgcaag tgatgattta ccaaaaatgt ttattgaatc ggacccagga      1860 ttctttttcca atgctattgt tgaaggtgcc aagaagtttc ctaatactga atttgtcaaa     1920
gtaaaaggtc ttcattttc gcaagaagat gcacctgatg aaatgggaaa atatatcaaa       1980
tcgttcgttg agcgagttct caaaaatgaa caataattct agagcggccg cttcgagcag      2040
acatgataag atacattgat gagtttggac aaaccacaac tagaatgcag tgaaaaaaat      2100
gctttatttg tgaaatttgt gatgctattg ctttatttgt aaccattata agctgcaata      2160
aacaagttaa caacaacaat tgcattcatt ttatgtttca ggttcagggg gaggtgtggg      2220
aggtttttta aagcaagtaa aacctctaca atgtggtaa aatcgataag gatccccggg       2280
taggggaggc gcttttccca aggcagtctg gagcatgcgc tttagcagcc ccgctgggca      2340
cttggcgcta cacaagtggc ctctggcctc gcacacattc cacatccacc ggtaggcgcc      2400
aaccggctcc gttctttggt ggccccttcg cgccaccttc tactcctccc ctagtcagga     2460
agttcccccc cgccccgcag ctcgcgtcgt gcaggacgtg acaaatggaa gtagcacgtc      2520
tcactagtct cgtgcagatg acagcaccg ctgagcaatg gaagcgggta ggcctttggg      2580
gcagcggcca atagcagctt tgctccttcg ctttctgggc tcagaggctg ggaaggggtg      2640
ggtccggggg cgggctcagg ggcgggctca ggggcgggg gggcgcccga aggtcctccg      2700
gaggcccggc attctgcacg cttcaaaagc gcacgtctgc cgcgctgttc tcctcttcct      2760
catctccggg cctttcgacc tgcagccaat atgggatcgg ccattgaaca agatggattg      2820
cacgcaggtt ctccggccgc ttgggtggag aggctattcg gctatgactg ggcacaacag      2880
acaatcggct gctctgatgc cgccgtgttc cggctgtcag cgcaggggcg cccggttctt     2940
tttgtcaaga ccgacctgtc cggtgccctg aatgaactgc aggacgaggc agcgcggcta     3000
tcgtggctgg ccacgacggg cgttccttgc gcagctgtgc tcgacgttgt cactgaagcg      3060
ggaagggact ggctgctatt gggcgaagtg ccggggcagg atctcctgtc atctcacctt      3120
gctcctgccg agaaagtatc catcatggct gatgcaatgc ggcggctgca tacgcttgat      3180
ccggctacct gcccattcga ccaccaagcg aaacatcgca tcgagcgagc acgtactcgg      3240
atggaagccg gtcttgtcga tcaggatgat ctggacgaag agcatcaggg gctcgcgcca      3300
gccgaactgt tcgccaggct caaggcgcgc atgcccgacg gcgaggatct cgtcgtgacc      3360
catggcgatg cctgcttgcc gaatatcatg gtggaaaatg gccgcttttc tggattcatc      3420
gactgtggcc ggctgggtgt ggcggaccgc tatcaggaca tagcgttggc tacccgtgat      3480
```

-continued

```
attgctgaag agcttggcgg cgaatgggct gaccgcttcc tcgtgcttta cggtatcgcc    3540
gctcccgatt cgcagcgcat cgccttctat cgccttcttg acgagttctt ctgaggggat    3600
ccgtcgacct gcagccaagc ttatcgataa aataaaggat ccaggtggca cttttcgggg    3660
aaatgtgcgc ggaacccta  tttgtttatt tttctaaata cattcaaata tgtatccgct    3720
catgagacaa taaccctgat aaatgcttca ataatattga aaaaggaaga gtatgagtat    3780
tcaacatttc cgtgtcgccc ttattccctt ttttgcggca ttttgccttc ctgttttgc     3840 tcacccagaa acgctggtga agtaaaaga  tgctgaagat cagttgggtg cacgagtggg    3900
ttacatcgaa ctggatctca acagcggtaa gatccttgag agttttcgcc ccgaagaacg    3960
ttttccaatg atgagcactt taaagttct  gctatgtggc gcggtattat cccgtattga    4020
cgccgggcaa gagcaactcg gtcgccgcat acactattct cagaatgact tggttgagta    4080
ctcaccagtc acagaaaagc atcttacgga tggcatgaca gtaagagaat tatgcagtgc    4140
tgccataacc atgagtgata acactgcggc caacttactt ctgacaacga tcggaggacc    4200
gaaggagcta accgcttttt tgcacaacat gggggatcat gtaactcgcc ttgatcgttg    4260
ggaaccggag ctgaatgaag ccataccaaa cgacgagcgt gacaccacga tgcctgtagc    4320
aatggcaaca acgttgcgca aactattaac tggcgaacta cttactctag cttcccggca    4380
acaattaata gactggatgg aggcggataa agttgcagga ccacttctgc gctcggccct    4440
tccggctggc tggtttattg ctgataaatc tggagccggt gagcgtgggt ctcgcggtat    4500
cattgcagca ctggggccag atggtaagcc ctcccgtatc gtagttatct acacgacggg    4560
gagtcaggca actatggatg aacgaaatag acagatcgct gagataggtg cctcactgat    4620
taagcattgg taactgtcag accaagttta ctcatatata ctttagattg atttaaaact    4680
tcatttttaa tttaaaagga tctaggtgaa gatcctttt  gataatctca tgaccaaaat    4740
cccttaacgt gagttttcgt tccactgagc gtcagacccc gtagaaaaga tcaaggatc     4800 ttcttgagat cctttttttc tgcgcgtaat ctgctgcttg caaacaaaaa aaccaccgct    4860
accagcggtg gtttgtttgc cggatcaaga gctaccaact cttttccga  aggtaactgg    4920 cttcagcaga gcgcagatac caaatactgt tcttctagtg tagccgtagt taggccacca    4980
cttcaagaac tctgtagcac cgcctacata cctcgctctg ctaatcctgt taccagtggc    5040
tgctgccagt ggcgataagt cgtgtcttac cgggttggac tcaagacgat agttaccgga    5100
taaggcgcag cggtcgggct gaacggggg  ttcgtgcaca cagcccagct tggagcgaac    5160
gacctacacc gaactgagat acctacagcg tgagctatga gaaagcgcca cgcttcccga    5220
agggagaaag gcggacaggt atccggtaag cggcagggtc ggaacaggag agcgcacgag    5280
ggagcttcca gggggaaacg cctggtatct ttatagtcct gtcgggtttc gccacctctg    5340
acttgagcgt cgatttttgt gatgctcgtc aggggggcgg agcctatgga aaaacgccag    5400
caacgcggcc ttttacggtt cctggccttt tgctggcctt tttgctcaca tggctcgac     5459
```

<210> SEQ ID NO 8
<211> LENGTH: 88
<212> TYPE: DNA
<213> ORGANISM: Homo sapiens

<400> SEQUENCE: 8

```
caaccggaag tggaacaacc ggaagtggaa caaccggaag tggaacaacc ggaagtggaa      60
caaccggaag tggaacaacc ggaagtgc                                        88
```